(12) United States Patent
Gundersen et al.

(10) Patent No.: US 11,178,049 B2
(45) Date of Patent: *Nov. 16, 2021

(54) DEVICE DEPLOYMENT AND NETWORK MANAGEMENT USING A SELF-SERVICE PORTAL

(71) Applicant: Level 3 Communications, LLC, Broomfield, CO (US)

(72) Inventors: Eric D. Gundersen, Broomfield, CO (US); Steven M. Rdzak, Arvada, CO (US); Rene Grippo, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/882,943

(22) Filed: May 26, 2020

(65) Prior Publication Data
US 2020/0287823 A1 Sep. 10, 2020

Related U.S. Application Data

(63) Continuation of application No. 16/103,549, filed on Aug. 14, 2018, now Pat. No. 10,673,747.
(Continued)

(51) Int. Cl.
| | |
|---|---|
| *G01R 31/08* | (2020.01) |
| *G06F 11/00* | (2006.01) |
| *H04L 12/721* | (2013.01) |
| *H04L 12/24* | (2006.01) |
| *H04L 12/851* | (2013.01) |
| *H04L 12/707* | (2013.01) |
| *H04L 12/803* | (2013.01) |
| *H04L 12/725* | (2013.01) |

(52) U.S. Cl.
CPC ............ *H04L 45/38* (2013.01); *H04L 41/082* (2013.01); *H04L 41/12* (2013.01); *H04L 41/18* (2013.01); *H04L 41/22* (2013.01); *H04L 45/22* (2013.01); *H04L 45/30* (2013.01); *H04L 47/122* (2013.01); *H04L 47/2441* (2013.01); *H04L 47/2483* (2013.01)

(58) Field of Classification Search
CPC ....... H04L 45/38; H04L 41/082; H04L 41/12; H04L 41/18; H04L 41/22; H04L 45/22; H04L 45/30; H04L 47/122; H04L 47/2441; H04L 47/2483
USPC ........................................ 370/235
See application file for complete search history.

(56) References Cited

U.S. PATENT DOCUMENTS

| | | | |
|---|---|---|---|
| 10,673,747 B2 * | 6/2020 | Gundersen | .............. H04L 41/12 |
| 2003/0005086 A1 | 1/2003 | Pouchak et al. | |

(Continued)

*Primary Examiner* — Davis D Hwu

(57) ABSTRACT

Systems and methods for provisioning network services include receiving a provisioning request and, in response, initiating a first configuration operation in which a network address is assigned to a piece of network equipment for providing the network service. A network service path is established to the address such that when the equipment is connected to the network, a second configuration operation may be initiated in which the equipment is initialized to perform one or more network functions in support of the network service. Submission of provisioning requests may be conducted through a portal or similar environment that further enables users to analyze, modify, or otherwise manage their network equipment and services.

20 Claims, 23 Drawing Sheets

Related U.S. Application Data

(60) Provisional application No. 62/545,832, filed on Aug. 15, 2017.

(56) References Cited

U.S. PATENT DOCUMENTS

| | | |
|---|---|---|
| 2010/0332631 A1 | 12/2010 | Sekine et al. |
| 2011/0292809 A1 | 12/2011 | Olgaard et al. |
| 2013/0113402 A1 | 5/2013 | Grabinger et al. |
| 2019/0058656 A1 | 2/2019 | Gundersen et al. |

* cited by examiner

FIG. 4A

DEVICE DEPLOYMENT AND NETWORK MANAGEMENT USING A SELF-SERVICE PORTAL

TECHNICAL FIELD

Aspects of the present disclosure involve provisioning of network services, and more particularly involve ordering and deployment of network elements through a self-service portal.

BACKGROUND

Telecommunications networks provide for the transmission of information across some distance through terrestrial, wireless, and/or satellite communication networks. Such communications may involve voice, data, or multimedia information, among others. In one example, a communication device, such as a phone or computer, is used to transmit and receive one or more communications to and from another user of the network. Of course, it is possible to use the network to obtain data and multimedia information from machines connected with the network, and to communicate and interact directly with machines to interact software, store information, conduct transactions, etc. Various machines may also be used to communicate over the telecommunications network. Thus, the network provides any number of components interconnected in such a manner as to facilitate the various types of digital interactions provided by the network. Stated differently, telecommunications networks include nodes, such as routers, switches, gateways, and other network components for transporting information.

As telecommunications networks and the interconnection of network nodes become increasingly complex, software-defined networking (SDN) architectures are deployed for simplifying network management and modification. Generally, network nodes provide data-forwarding functionality and management functionality. Stated differently, network nodes may include management functionality for selecting a destination to send network traffic and data-forwarding functionality for forwarding the network traffic to the selected destination. SDN provides more flexibility to networks by decoupling a control plane (resource, routing, and other network management functionality) from a data plane (data-forwarding functionality) enabling network control to become directly programmable and the underlying infrastructure to be abstracted from applications and network services.

Provisioning a network service using SDN or hybrid networking (which may include both SDN and traditional networking) may require the deployment of one or more pieces of customer premises equipment (CPE). Deployment can include both physically connecting the CPE to a telecommunications network over which the network service is provided and configuring the CPE to communicate with both the telecommunications network and any other CPE that may already be installed at the customer site for providing other network services.

Historically, installation of a new CPE requires a technician affiliated with the network service provider to physically deliver and install the CPE. Accordingly, installation of new CPE is inherently limited by the schedules and availability of both customers and service provider technicians. Even after installation, modification of installed CPE and, in particular, modification of functionality related to the interaction between the new CPE and a customer's existing network services and/or existing CPE may further require assistance of a technician. As a result, to the extent all but the most basic changes to a customer network are required, customers face delays to make such changes and incur costs associated with such delays. Such limitations are also costly for network service providers who must hire and retain a geographically dispersed network of technicians to install and maintain CPE.

It is with these observations in mind, among others, that aspects of the present disclosure were conceived.

SUMMARY

In one aspect of the present disclosure a method of provisioning network services is provided. The method includes receiving, through a portal accessible by a user computing device, a provisioning request to provision a network service through a network, the network service requiring installation of customer premise equipment (CPE). In response to the provisioning request, a first configuration operation of the CPE is performed that includes setting a network address of the CPE. After receiving a notification that the CPE is physically connected to the network a second configuration operation of the CPE is executed in which initializing one or more network functions of the CPE are initialized.

In another aspect of the present disclosure, a system for provisioning network services is provided. The system includes one or more computing devices configured to provide a portal accessible by a user computing device and to receive a provisioning request through the portal from the user computing device to provision a network service over a network. In response to receiving the provisioning request, the one or more computing devices are configured to initiate a first configuration operation for customer premise equipment (CPE) required to provide the network service, the first configuration operation including assigning a network address to the CPE. When a notification that the CPE is coupled to the network is received by the one or more computing devices, a second configuration operation for the CPE is initiated in which one or more network functions of the CPE corresponding to the network service are initialized.

In yet another aspect of the present disclosure, a method of provisioning network services is provided. The method includes initiating a first configuration operation for customer premise equipment (CPE) required to provide a network service through a network, the first configuration operation including automatically assigning a network address to the CPE based on stored customer network data. The method further includes establishing a network service path within the network, the network service path including the network address assigned to the CPE and receiving a notification that the CPE is coupled to the network. The method also includes, in response to receiving the notification, initiating a second configuration operation for the CPE, the second configuration operation including initializing one or more network functions of the CPE required for providing the network service.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

FIGS. 4A-C are screenshots of a configuration and ordering user interface of the example self-service portal.

DETAILED DESCRIPTION

Figure 1:
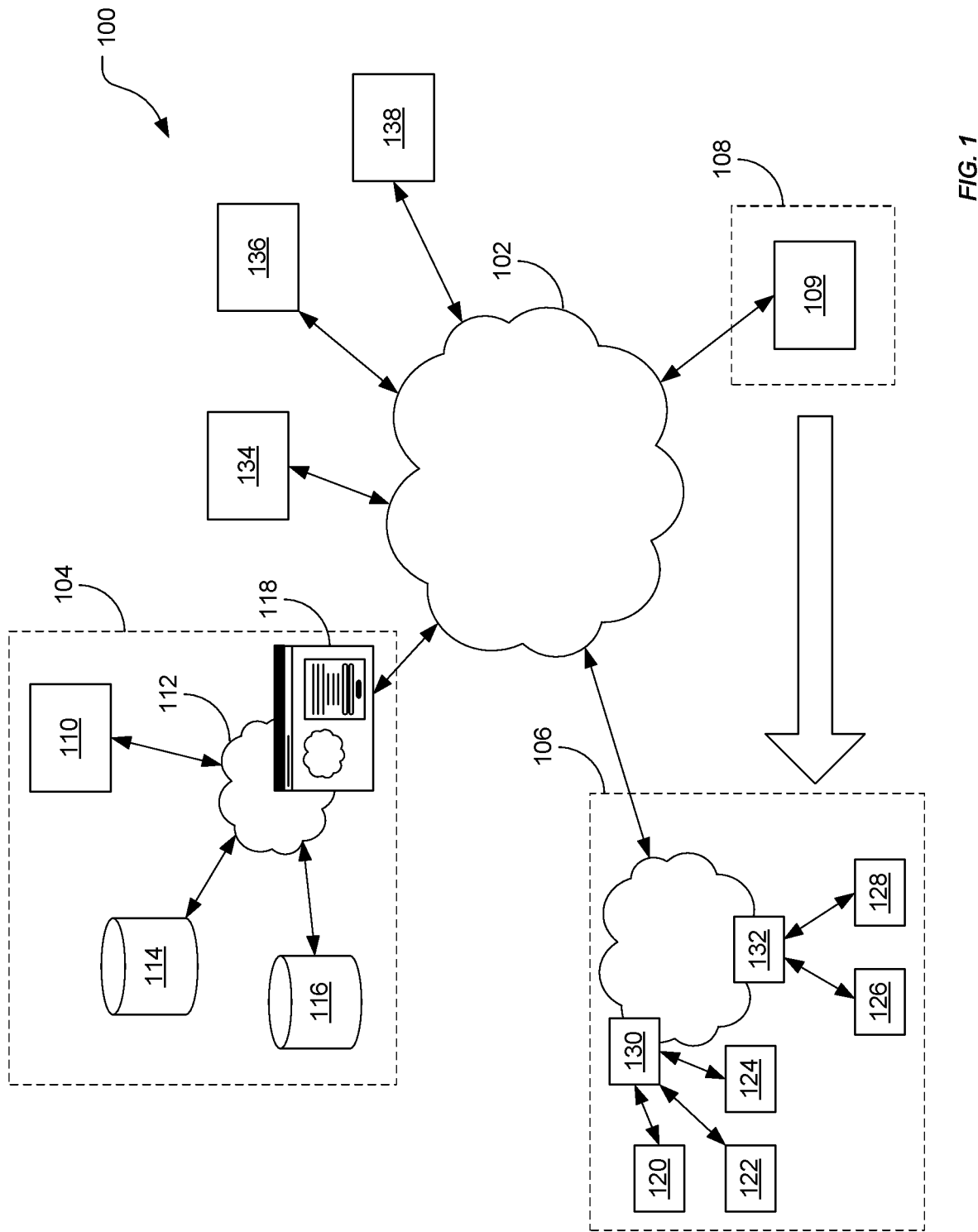
FIG. 1 is a schematic illustration of an example network environment for provisioning and managing network services.

This patent application involves, among other things, a self-service portal and associated back-end computing system that provide for deployment and installation of customer premises equipment (CPE) associated with telecommunications network services. The self-service portal enables customers to review and modify existing network services and to order new network services. In addition to hosting the self-service portal, the computing system is in communication with one or more second computing systems that preconfigure and initiate delivery of network equipment required for provisioning new network services. For example, in one implementation, a first configuration operation is initiated in which the new equipment is provided with a network address. In conjunction with the first configuration, a network service path to the address is established through the network. After receiving notification of delivery of the new equipment, the computing system further guides customers through initial connection and installation. In certain implementations, once the equipment has been connected, the computing device initiates a second configuration operation in which the equipment is configured to perform one or more network functions.

In implementations of the present disclosure, a computing system of a network service provider hosts a self-service portal accessible by users of network services provided by the network service provider. The self-service portal enables the users to monitor and configure existing network services and to order new network services. In certain implementations, ordering of new network services includes a configuration process including a dynamic network diagram that visually represents the network topology associated with the new network service that may be ordered.

During the order process, the computing system obtains address information for the new equipment and transmits the address information to a second computing system adapted to preconfigure the new equipment with the address information. Once preconfigured with the address information, the second computing system may further initiate a shipping process to deliver the new equipment to the user.

After delivery of the new equipment, the user may send a notification to the computing system through the customer portal to initiate the installation process. Generally, the installation process includes providing instructions to the user in the form of an installation wizard. The installation wizard guides the user through physical connection of the new equipment to a telecommunications network over which the new service is to be provided. Once physically connected, the computing system provisions a network service path by configuring one or more network elements of the telecommunications network through which the service is to be provided. The computing system may then issue a notification to the second computing system to complete configuration of the new equipment. Such additional configuration may include downloading one or more pieces of software/firmware from the second computing system to the new equipment and initiating installation of the downloaded software/firmware at the new equipment.

In certain implementations, the new equipment provided to the user may include one or more pieces of customer premise equipment (CPE) and may further include one or more virtual CPE (vCPE) appliances. vCPE appliances include computing and networking hardware that may be configured through software to perform various network functions including, without limitation, one or more of routing, switching, firewall or similar security functions, VPN connectivity, and network address translation. Accordingly, prior to delivery of a new vCPE appliance to the user, the new vCPE appliance may be configured with basic address information necessary to connect the new vCPE appliance to the telecommunications network. After connection of the new vCPE appliance, the second computing system may then perform a second configuration process in which software is downloaded to and installed on the new vCPE appliance which configures the new vCPE appliance to perform one or more specific network functions.

In certain implementations, the self-service portal further enables a user to operate a software defined wide area network (SDWAN) or hybrid wide area network (hybrid WAN or HWAN) that includes both physical and software-defined network elements. More specifically, the customer portal may provide an interface through which a user analyzes, manages, and modifies existing network services and, in particular, network services that may correspond to different branches of a software-defined or hybrid enterprise network. For example, the customer portal may allow the user to, among other things, provision new network services; update configurations of network elements along one or more network branches; activate or repurpose network elements; monitor branch traffic details and health; receive and analyze alarms or similar events from network elements; generate reports and other analytics on a network element, branch, or network-wide basis; and implement traffic steering rules between network branches.

FIG. 1 is a schematic illustration of an example network environment 100 for provisioning and managing network services. In one implementation, a primary network 102 is in communication with multiple networks 104-108 to provide telecommunications services to end users. The primary network 102 may be operated by a telecommunications provider that facilitates communication and exchange of traffic between the various networks to provide the telecommunications services. In one implementation, for example, the primary network 102 corresponds to an operator maintaining a tier-1 or similar network with a backbone stretching over a large geographical region, such as the United States. The other various networks in communication with the primary network 102, including a service provider network 104, a customer network 106, and a network device provider network 108, may be wired or wireless networks under the control of or operated/maintained by one or more entities, such as an Internet service provider (ISP) or Mobile Network Operator (MNO), that provide access to the primary network 102. Thus, for example, the service provider network 104 may correspond to an operator of the primary network 102 and the customer network 106 may correspond to a customer of the operator (or an ISP) and for which the operator provides network services over the primary network 102. Although one customer network is shown in the network environment 100, more or fewer customer networks may interface with the primary network 102.

The service provider network 104 may include one or more computing systems and data sources adapted to facilitate ordering and management of network services by a user or customer associated with the customer network 106. For example, in the implementation of FIG. 1, the service provider network includes a service provider computing system 110 in communication over a service provider network 112 with one or more data sources, such as data sources 114 and 116. The service provider computing system 110 may include one or more computing devices configured to operate a self-service portal 118 through which the user may monitor and/or modify aspects of the customer network 106. The service provider computing system 110 may also be communicatively coupled to one or more network elements of the primary network 102 and be capable of reconfiguring the network elements of the primary network 102 to provision network services through the primary network 112.

The customer network 106 includes network elements adapted to facilitate communication between devices 120-128 of the customer network 106. In certain implementations, the customer network 106 may be a wide area network (WAN) in which the network elements are geographically distributed. For example, the customer network 106 may connect and facilitate communication between multiple branches or systems of a customer enterprise. Each premise of the customer network 106 may include one or more pieces of customer premise equipment 130, 132 for communicatively coupling the devices 120-128 to one or more sub-networks 134 within the customer network 106 and/or to the primary network 102. The customer network 106 may include multiple branches to facilitate communication within the customer network 106 and externally to the primary network 102. The connection type, bandwidth, protocol, ISP, and other characteristics of any given branch may vary. For example, the customer network 106 may include a first set of branches operated using digital subscriber line (DSL) technology provided by a first ISP and second set of branches operated using one or more cable connections provided by one or more second ISPs. One or more devices 128-132 associated with the customer may also be able to access the primary network 102 through the customer network 106 or one or more secondary networks communicatively coupled to the primary network 102.

During operation, the self-service portal 118 allows an authorized user of the customer network 106 to manage services of the customer network 106. Such management may include, without limitation, ordering one or more new services, cancelling or modifying existing services, and performing analytics and diagnostics related to existing services and the broader customer network 106. To facilitate accessibility, the self-service portal 118 may be accessible over the primary network 102 or similar network through a web-based interface executed on one or more computing devices 134-138 which may include, without limitation, tablets, smart phones, desktop computers, laptops, and other similar computing devices.

When a new service is ordered using the self-service portal 118, new equipment may be required to implement the new service. Such equipment may take the form of a "white box" network device or appliance, also referred to herein as virtual CPE (vCPE) appliance. In contrast to conventional network devices that include hardware and predefined software for performing a specific set of functions, vCPE appliances may have a core hardware platform that can be dynamically configured or made to execute software to perform multiple network functions. For example, a vCPE appliance may be delivered to a customer with basic preconfigured settings that enable the vCPE appliance to be connected to the primary network 102 (either directly or through one or more intermediate network devices) and identified by the service provider computing system 110. Once connected and identified, a subsequent configuration of the vCPE appliance may be initiated by the service provider computing system 110 during which the vCPE appliance is further configured (for example, through the delivery and installation of software or firmware) to perform a specific function required to provide the ordered service.

The service provider computing system 110 may be adapted to receive an order and corresponding order specifications from a user of the self-service portal 118. During the order placement process, the service provider computing system 110 may retrieve customer and network data from one or more data sources, such as data sources 114 and 116. For example, in certain implementations, the service provider computing system 110 may retrieve data corresponding to a customer's existing network including, without limitation, details regarding existing equipment installed in the customer network, address information of devices within the customer's network, identifiers of virtual private networks (VPNs) associated with the customer, technical specifications of existing customer equipment, details of services provided to the customer (including services provided by third-party vendors, such as internet service providers (ISPs)), details regarding service paths implemented to provide the customer with existing services, and information regarding service level agreements between the service provider and the customer. In addition to the stored information, the service provider computing system 110 may receive additional information from a user through the self-service portal 118 during the order entry process. Such information may include, without limitation, a geographic location or address where the new service is to be provided, information regarding existing services of the customer, and customer preferences regarding the new service. In certain implementations, the information collected by and provided to the service provider computing system 110 may be used to dynamically update a graphical representation of the customer's network (or a portion thereof) to include any new network service paths and equipment.

After an order is finalized and confirmed through the self-service portal 118, the service provider computing system 110 may transmit customer network data to a network device provider computing system 109 of the network device provider network 108. The network device provider computing system 109 may facilitate preconfiguration of one or more vCPE appliances or similar white box devices. The customer network data generally corresponds to information for locating the equipment within the customer network and, as a result, may include one or more of a device address, a device port, and a VPN identifier. Upon receiving the customer network data, a network device provider may configure the one or more vCPE appliances according to the customer network data and ship the vCPE appliances to the customer for installation. When the customer receives the vCPE appliances, the customer may log into the self-service portal 118 to notify the service provider that the vCPE appliances have been received and that the customer is ready to install the vCPE appliances and initialize the corresponding service.

Ordering of a new service through the self-service portal 118 may initiate provisioning of a network service path over the primary network 102. More specifically, ordering a new service may cause the service provider computing device 110 to initiate configuration of one or more network devices of the primary network 102 to provide the ordered service. For example, such configuration may include, among other things, assigning a plurality of ports and/or interfaces of network devices of the primary network 102 to define a network service path over which the network service is provided.

In certain implementations, the process of ordering a new service and corresponding equipment through the self-service portal 118 generates order data that may be used to customize an installation wizard or similar setup utility provided through the self-service portal 118. For example, information obtained during the ordering process regarding existing network devices, other services provided to the customer, and specifications for any new equipment may be used to generate an installation wizard that provides step-by-step instructions for installing the new equipment and initializing the new network service.

As previously noted, in certain implementations, installation of new equipment may include installation of one or more vCPE appliances or similar white box devices. In such instances, the vCPE appliance may arrive at the customer site in a minimally configured state. More specifically, the vCPE appliance may be configured such that it may be connected to a broader network, such as the primary network 102, but will generally lack the specific software and/or firmware required for the vCPE appliance to perform the specific function required for the ordered service. As a result, the installation wizard serves to guide the customer through physical setup (e.g., coupling to the primary network 102) of the vCPE appliance such that the service provider computing device 110 may initiate additional configuration of the vCPE appliance through downloading and installation of software and firmware to the vCPE appliance.

Figure 2:
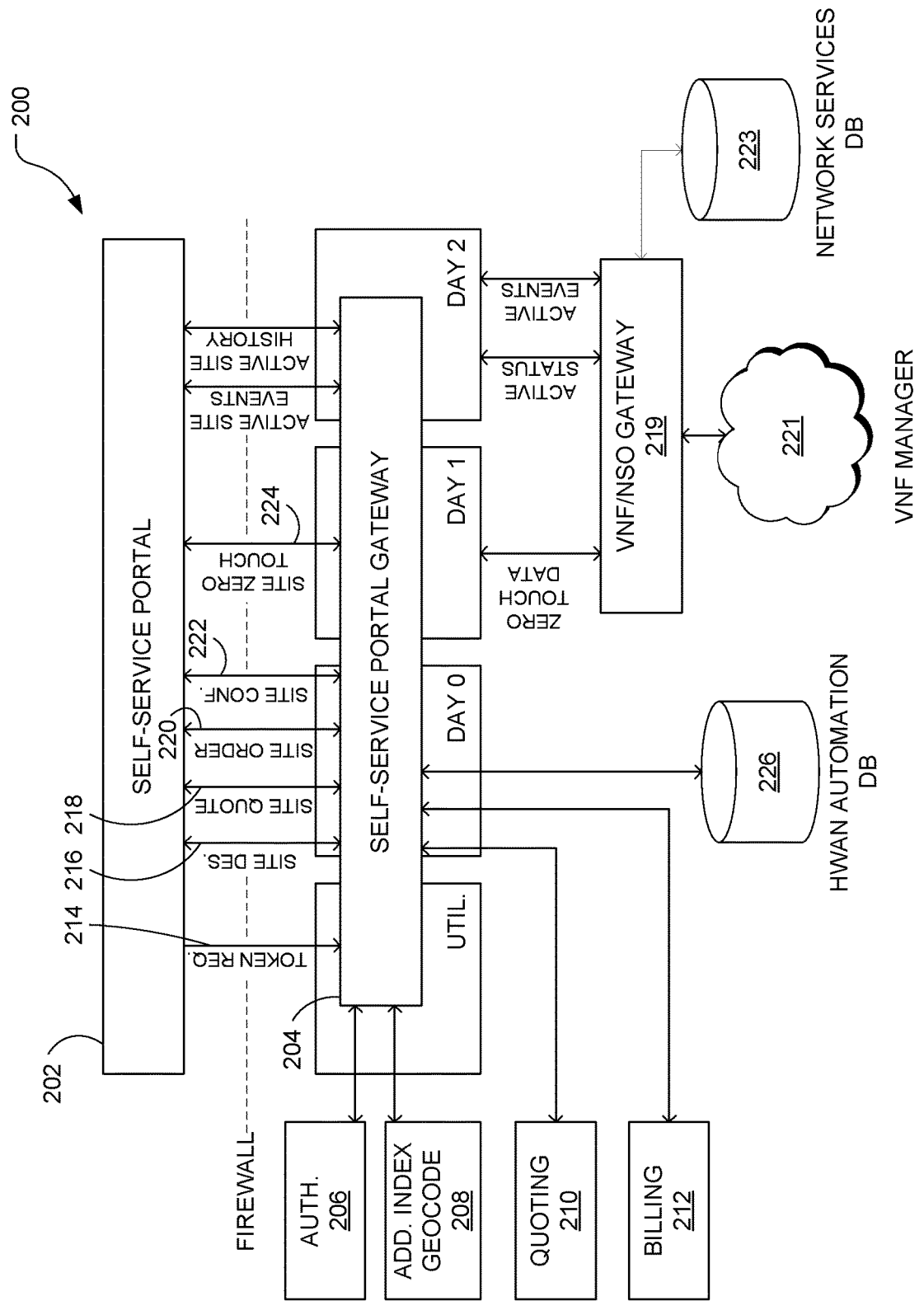
FIG. 2 is a network architecture diagram of a system for provisioning and managing network services.

FIG. 2 is a network architecture diagram of a self-service portal system 200 illustrating workflow for performing various tasks related to provisioning and managing network services through a self-service portal 202. As illustrated in FIG. 2, services associated with the self-service portal 202 may include "Utility Services" related to general utilities used in conjunction with the self-service port 202. Additional services may include "Day 0 Services" which correspond to designing and ordering new network services, "Day 1 Services" which generally relate to installation and provisioning of new services, and "Day 2 Services" which generally correspond to ongoing monitoring, analysis, and modification of previously provisioned network services. In discussing the functionality of the self-service portal system 200, additional reference is made to FIGS. 3A-G, FIGS. 4A-C, and FIGS. 5A-J, which illustrate example user interfaces for performing various tasks through the self-service portal 202.

Functionality of the self-service portal 202 may be facilitated by a self-service portal gateway 204 in communication with various systems including, without limitation, an authentication system 206, an address index geocode system 208, a quoting system 210, and a billing system 212. Accordingly, as a user interacts with the self-service portal 202 to manage existing services and order new services, commands received through the self-service portal 202 may be directed as required by the self-service portal gateway 204. In certain implementations, different functions of the self-service portal 202 may be implemented using application program interfaces (APIs) 214-224, each of which may include a set of subroutines, definitions, protocols, and tools for interacting with the self-service portal gateway 204 to perform various functions.

As illustrated in FIG. 2, utility services may include, among other things, user authentication and address geocoding. User authentication through the self-service portal may include, among other things, registering a new user, including creating new credentials for the new user and verifying the credentials of existing users. In one implementation, the self-service portal 202 may request or otherwise perform authentication using a token request API 214 adapted to transmit credentials received from a user of the self-service portal 202 to the authentication system 206 and to return an authentication token to the user. The self-service portal 202 may further include functionality to interact with the address index geocode system 208 to perform various geocoding functions including, among other things, translation between physical (e.g., street) address information, spatial reference points, and IP addresses associated with a specific user or network equipment.

Day 0 services are generally involved in the initial ordering of a new service and associated equipment, which may include one or more vCPE appliances or similar white box devices and may include various interactions between the self-service portal 202 and the self-service portal gateway 204 using one or more APIs 216-222. Such APIs may include a site design API 216 for facilitating design of a branch of the customer network for providing a new service. The site design API 216 may provide functionality directed to retrieving and visually presenting data corresponding to, among other things, existing network services and equipment of the user and potential network services and equipment that may be provided to the user. Such information may be stored, for example, in a database 226, identified in FIG. 2 as an HWAN Automation Database 226, or other data source communicatively coupled to the self-service portal gateway 204 and may be retrieved by self-service portal 202 from the self-service portal gateway 204 using functions of the site design API 216. The site design API 216 may further provide functionality for receiving input from a user and dynamically generating an updated view of the network branch associated with the new service. For example, the user may provide additional details or specification parameters regarding, among other things, existing network equipment or services provided to the user or preferences of the user regarding any new equipment required to provision a new service.

The database 226 may be a collection of one or more databases containing data for facilitating design of a network branch corresponding to a new network service and ordering of the new network service. Such data may include, among other things, previously obtained data corresponding to the topology of an existing customer network (including specifications for any existing equipment in the customer network and addressing and configuration information for any such equipment), specifications for available network equipment that may be used in providing a new service, and order information for previously designed network services. Order information for previously designed network services may include a listing of any equipment required to provide the network service, configuration parameters for such equipment, topology data for the branch associated with the service including addressing and interconnection details, and any other aspects of the ordered service.

During the design process, the self-service portal 202 may execute functions of a site quote API 218 to obtain pricing information for the service being designed. In certain implementations, functions of the site quote API 218 may submit order details corresponding to the current service design to a quoting system 210 (through the self-service portal gateway 204) and may receive, in response, pricing details for the current service design. Such design details may include, without limitation, a listing of equipment required to provide the service and specification details provided by the user regarding the service. The quoting system 210 may then return pricing and terms for implementing the ordered service for display via the self-service portal 202. In certain instances, the quoting system 210 may provide only a price for the current service design without pricing details for individual components. In other instances, the quoting system 210 may return a breakdown of components of the current service design including individual pricing information for each component.

In response to a user accepting a quote, the self-service portal 202 may submit an order for the designed service using functions of a site order API 220. Similar to the site quote API 218, the site order API 220 may include functions directed to generating a final specification and providing the order to the self-service portal gateway 204 for processing.

As illustrated in FIG. 2, the self-service portal 202 may also include a site configure API 222 that provides functions directed to generating equipment configurations for services ordered through the self-service portal 202. For example, after finalizing an order, functions of the site configure API 222 may be used to generate a final specification for the order. Generating the final specification may include generating customer network data including specific address and port assignments for the equipment used to provide the network service. Such equipment may include one or both of new equipment to be provided to the customer and existing customer equipment. To the extent existing network equipment is used, at least in part, to provide the ordered service, generating the final specification may include retrieving existing customer network data, such as device addresses and port assignments for any existing equipment, from the database 226. The final specification may then be generated by assigning any new equipment to unused addresses and determining port assignments for interconnecting the new equipment with the existing equipment or any additional new equipment. After generating the final specification, the corresponding customer network data may be stored in the database 226.

Order processing may include, among other things, adding an entry (and a new account, if necessary) to a billing system 212, which, in certain implementations may be a SWIFT system, and communicating the customer network data corresponding to the order to a network device provider, such as the network device provider computing system 109 of FIG. 1, that may be tasked with configuring and delivering any new equipment required for the ordered service to the customer. In certain implementations, for example, the new equipment may be provided in the form of one or more vCPE appliances. Accordingly, when the network device provider computing system 109 receives the customer network data associated with a new order, the network device provider computing system 109 may initiate preconfiguration of one or more vCPE appliances in accordance with the customer network data. As a result, the one or more vCPE appliances may be configured such that, when physically connected at the customer site, addressing and routing for the new equipment is consistent with that of the final specification generated in response to the order being confirmed by the user.

In addition to being used to preconfigure new equipment, the final specification and corresponding customer network data may be used to dynamically generate an installation wizard for guiding a customer through installation and initialization of equipment used to provide the ordered network service. Generating an installation wizard may include generating a set of installation wizard modules directed to installation and initiation of each piece of equipment for an ordered service. The specific modules and order of the modules included in a specific installation wizard for a given order may be determined, at least in part, by the customer network data stored within the database 226. For example, an order including a vCPE appliance for connecting to a broader telecommunications network and an access point for providing wireless service will generally require that the vCPE appliance be installed and configured before installation of the access point. Additional details within each module of the installation wizard may also be modified based on the customer network data. For example, portions of an installation wizard module directed to physically connecting a piece of equipment may indicate a specific port of the equipment to which a cable is to be connected. Based on the customer network data, the specific port indicated in the module may vary to reflect the actual configuration of the customer's network.

Figure 4A:
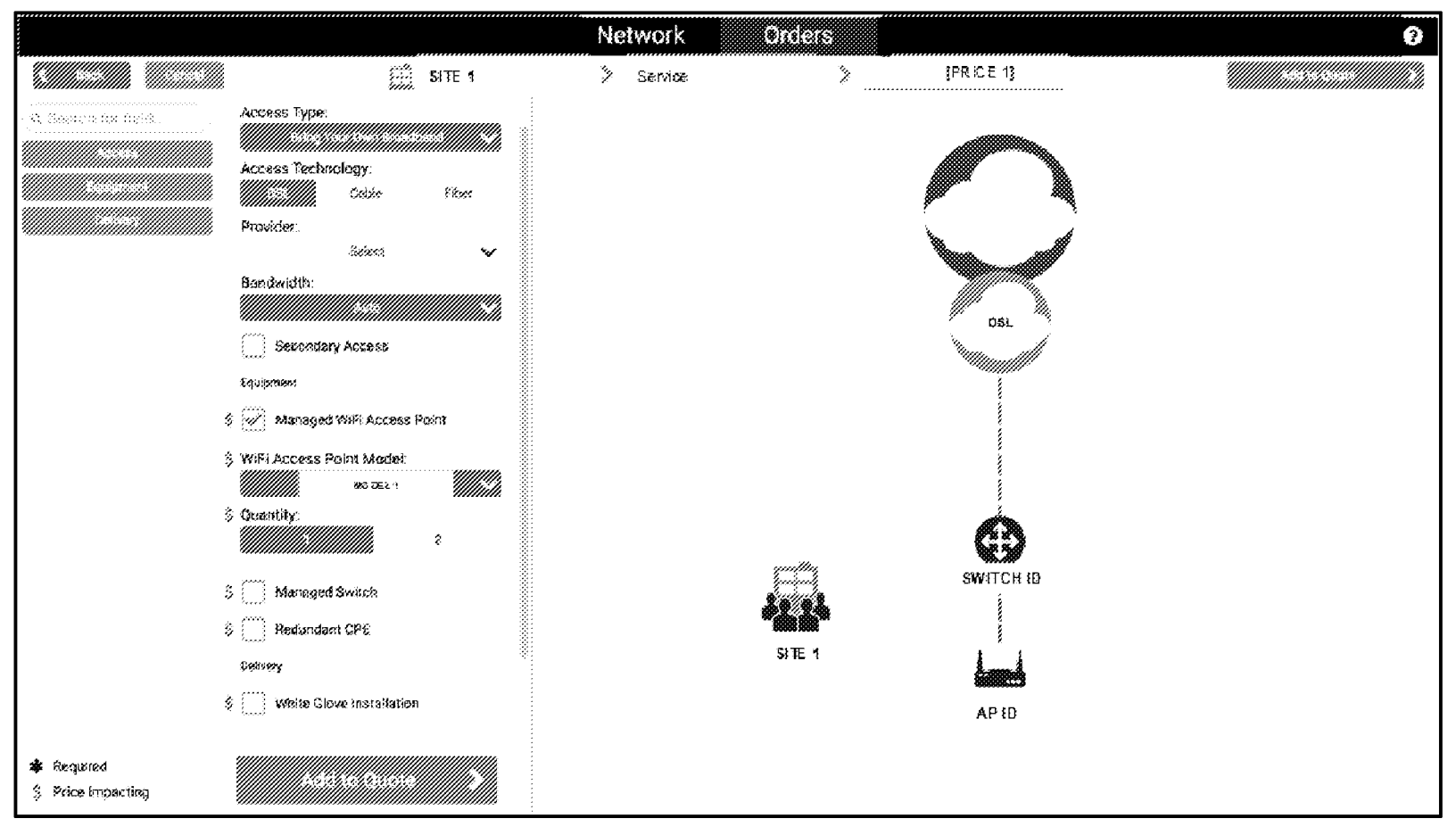
Figure 4B:
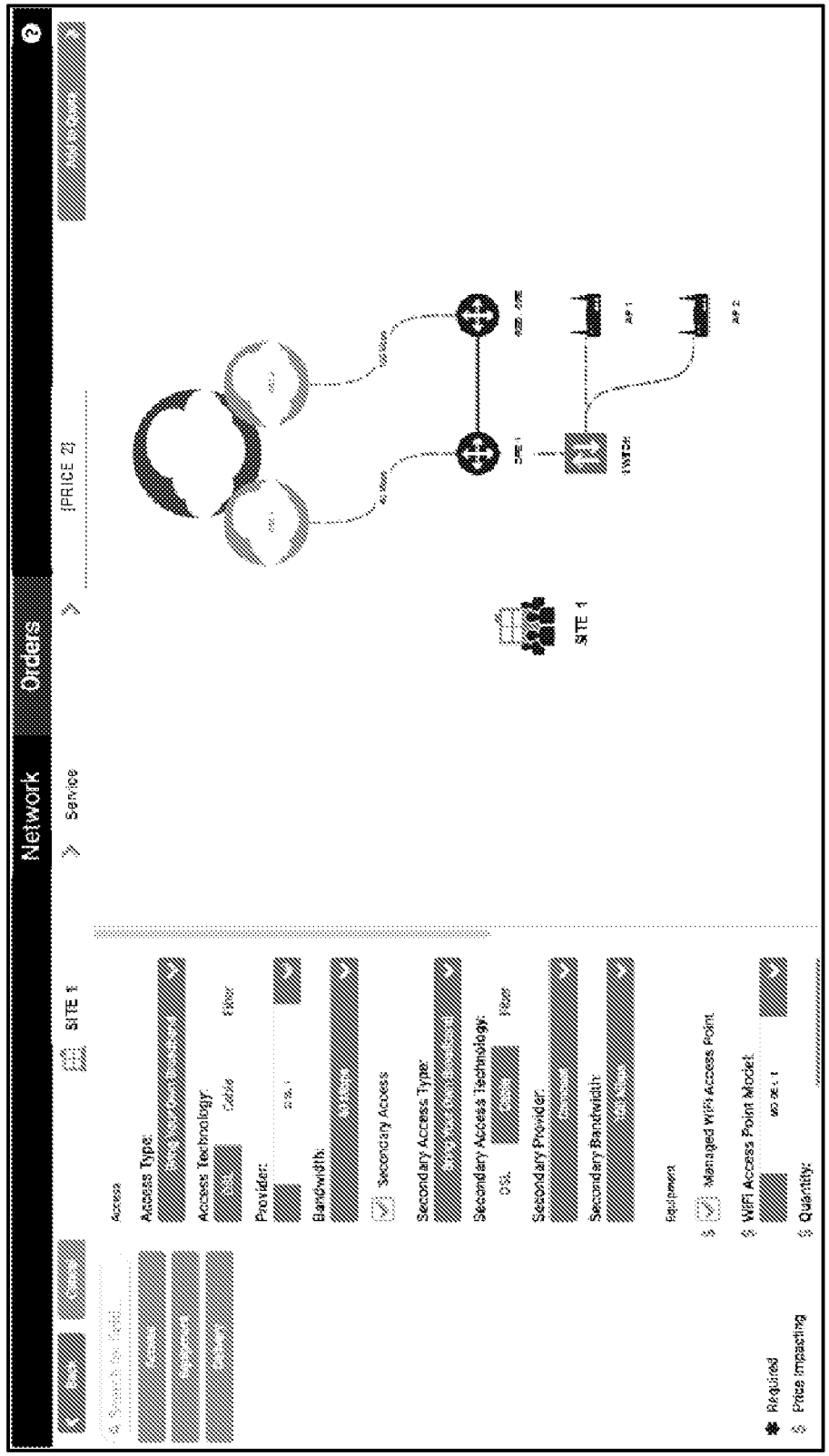
Figure 4C:

The process of ordering a new service is further illustrated in FIGS. 4A-C, which depict an example interface of a self-service portal, such as the self-service portal 202 of FIG. 2, and, more specifically, portions of the self-service portal 202 through which a user may configure and order a new service. Referring first to FIG. 4A, a user may select a site and desired service using the self-service portal 202 and, in response, an initial network representation for providing the network service may be displayed to the user.

As illustrated in FIG. 4A, the selected service is to be provided at SITE 1 and the initial network representation includes each of a modem or similar customer premises equipment (CPE) and an access point (AP), such as a router. In certain implementations, the self-service portal 202 may automatically populate the order based on, among other things, a default setup for the selected service and information available to the self-service portal 202 regarding the existing network associated with the user. Such data may be stored, for example, in the database 226 of FIG. 2 and may be obtained from, among other things, previous orders submitted by the user and previous information provided by the user regarding the network of the user.

During the design process, the user may provide additional details or specifications for the network service of interest. As shown in the transition between FIGS. 4A and 4B, for example, the interface may dynamically update the network representation to reflect changes in the necessary branch topology for providing the current design of the service. More specifically, FIG. 4A illustrates a relatively basic configuration for providing the service of interest in which the service is provided using a single broadband line requiring only one piece of CPE and a corresponding access point. In contrast, the configuration illustrated in FIG. 4B adds each of a second broadband line, a redundant CPE (RED. CPE), an additional access point (AP 2), and a switch (SWITCH) for communicating between the access points and the CPE.

As previously discussed, during the design process, the network schematic or data corresponding thereto may be submitted to the quoting system 210 to dynamically update pricing information for the current service. For example, the interface indicates a first price of PRICE 1 for the first configuration illustrated in FIG. 4A and a second price of PRICE 2 for the second configuration illustrated in FIG. 4B. The quoting system 210 may also generate and provide more detailed quote information to the self-service portal 202 during the configuration process or when the configuration has been finalized. For example, FIG. 4C illustrates a more comprehensive price breakdown of the design of FIG. 4B including pricing information for each component of the design. After reviewing a quote, such as that illustrated in FIG. 4C, the user may subsequently submit an order for the corresponding service, which is then processed as previously described.

Day 1 services generally correspond to connecting and initializing a new service and any corresponding equipment. As shown in FIG. 2, execution of Day 1 services may include interaction between the self-service portal 202 and the self-service portal gateway 204 using a site zero touch API 224. The site zero touch API 224 is a set of functions for providing "zero-touch" provisioning of the equipment and associated network services. In general, installation of new equipment through zero-touch provisioning (or ZTP) requires only that the equipment be physically connected to a telecommunications network, such as the primary network 102, in accordance with the customer network data generated during ordering of the service. After connection, additional configuration of the equipment, including, without limitation, updating an operating system of the equipment, deploying a patch or bug fix to the equipment, and specific configuration of device parameters, may occur without further intervention.

In light of the foregoing, a user may log into the self-service portal 202 and confirm that equipment for a new service has been received by the user. In response, the self-service portal 202 may initiate a corresponding installation wizard to guide the user through the physical installation of the new equipment. As previously discussed, the installation wizard may be customized and dynamically generated based on the customer network data associated with the service being initialized. In general, however, the installation wizard includes a set of modules to guide a user through connection of the new equipment to existing equipment or other pieces of new equipment for providing the ordered service. Once a piece of equipment is connected in accordance with the guidance provided by the installation wizard, the user may confirm connection through the self-service portal 202, causing the self-service portal 202 to initiate a subsequent configuration of the device. As previously described in FIG. 1, for example, the self-service portal 202 may notify a service provider computing device 110 or other computing device in communication with the newly connected equipment that connection is complete. In response, the service provider computing device 110 or another computing system, such as the network device provider computing system 109 may initiate any required updating or reconfiguration of the new equipment. In certain implementations, the network services provided to the user are implemented as part of a virtualized network. Accordingly, ZTP may further include the self-service portal gateway 204 communicating with a virtualized network function (VNF) manager 221 through a VNF/network services orchestrator (NSO) gateway 219 to initialize the functionality associated with the new service. As illustrated in FIG. 2, the VNF/NSO gateway 219 may also be in communication with a network services database 223 within which a list of network services and associated parameters of those services are maintained such that the VNF manager 221 may control or otherwise manage virtualized elements of a given network to provide network services.

An example of an installation wizard is illustrated in FIGS. 5A-J. The example installation wizard corresponds to installation of equipment for the basic configuration illustrated in FIG. 4A. More specifically, the equipment to be installed using the example installation wizard includes a single CPE and a single access point.

Figure 5A:
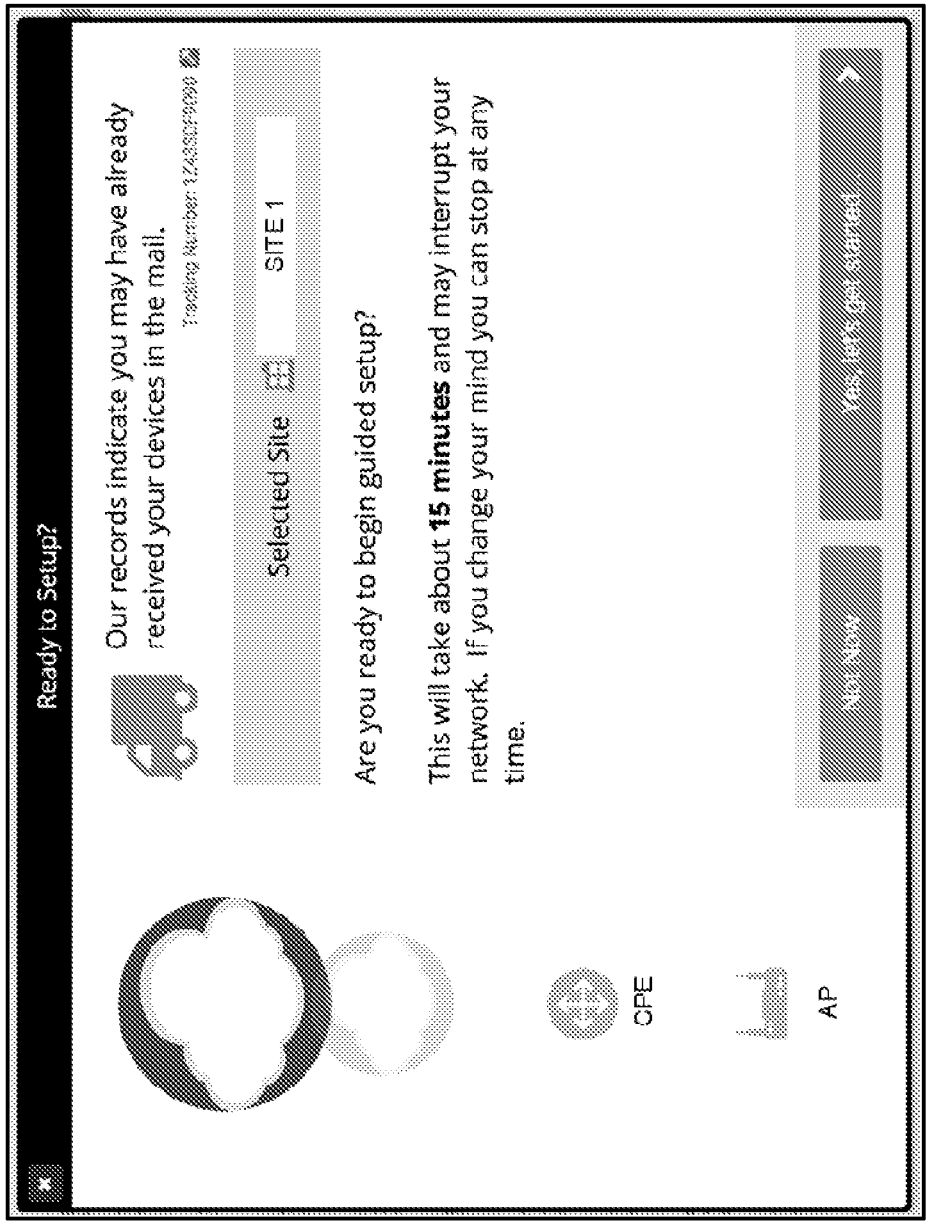
FIGS. 5A-J are screenshots of an installation wizard of the example self-service portal.
Figure 5B:
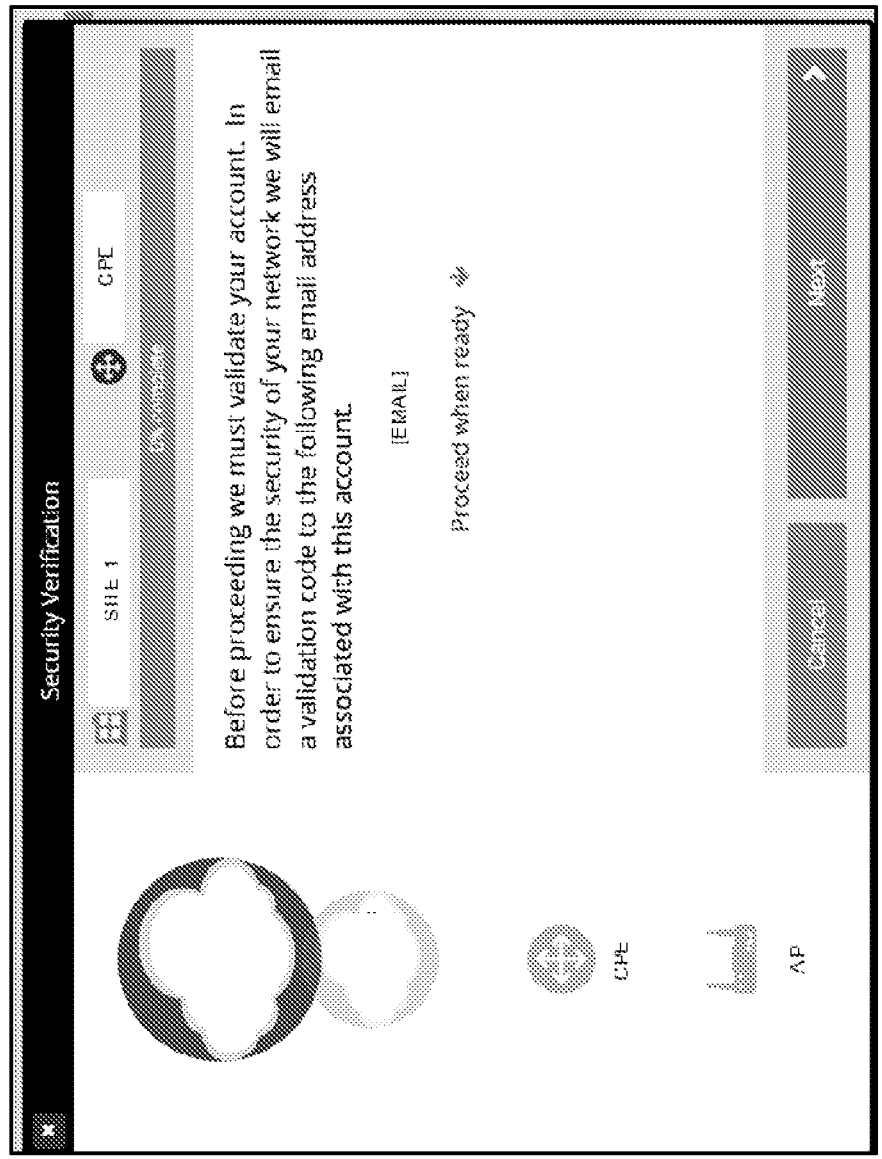
Figure 5C:
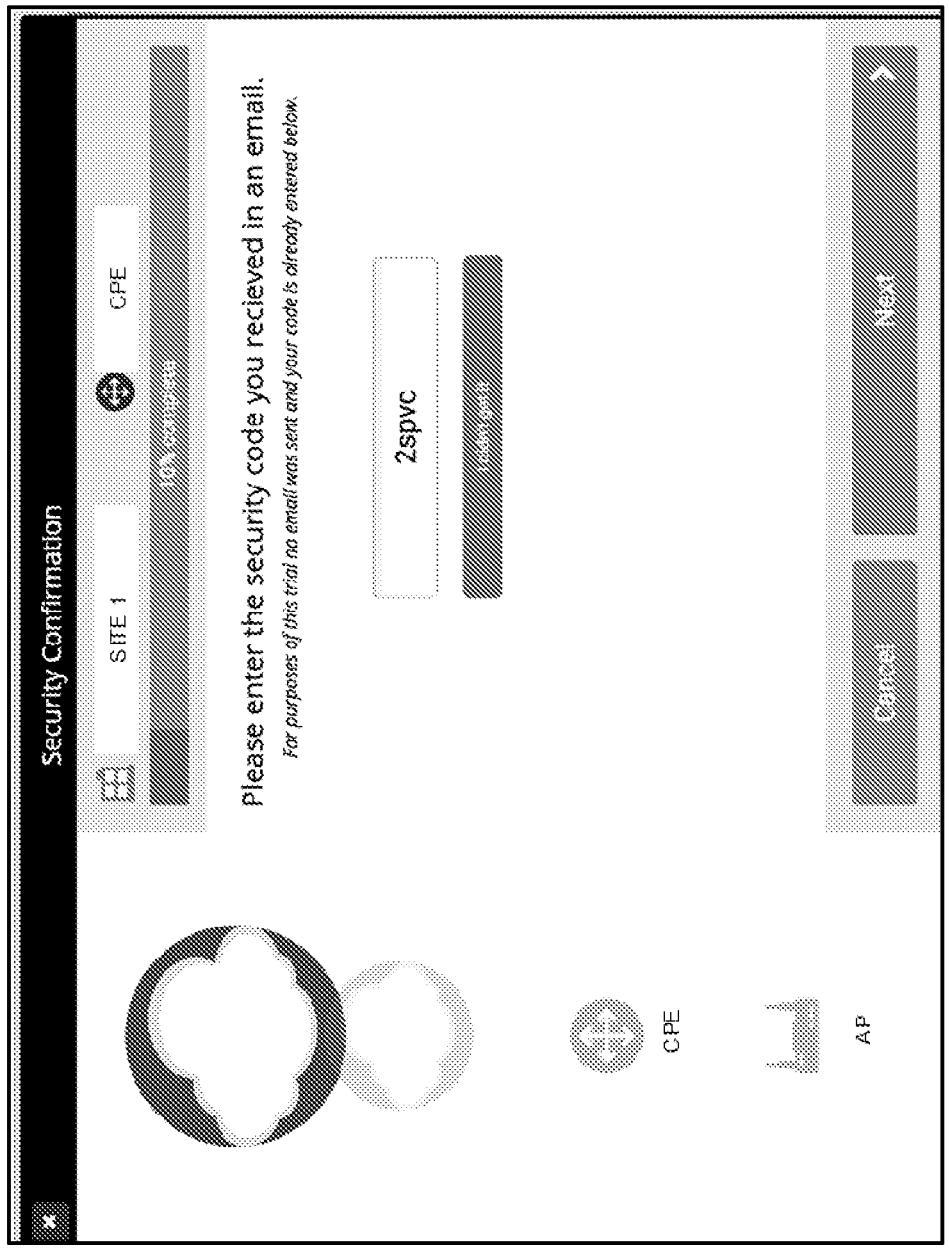

FIGS. 5A-C illustrate initial login and authorization of the user. In certain implementations, the user may initiate the wizard and bring up the introductory screen (FIG. 5A) by logging into the self-service portal and confirming receipt of the equipment to be installed. In certain implementations, an additional security confirmation may be implemented in the form of a temporary security or validation code that is sent to the user's email address, as illustrated in FIGS. 5B-C. Each of the initial login process to the self-service portal and any subsequent authentication process (such as use of an authorization code) may occur, in part, by the self-service portal 202 submitting and receiving authorization information to the authentication system 206 and may further include use of functions provided by the token request API 214.

Figure 5D:
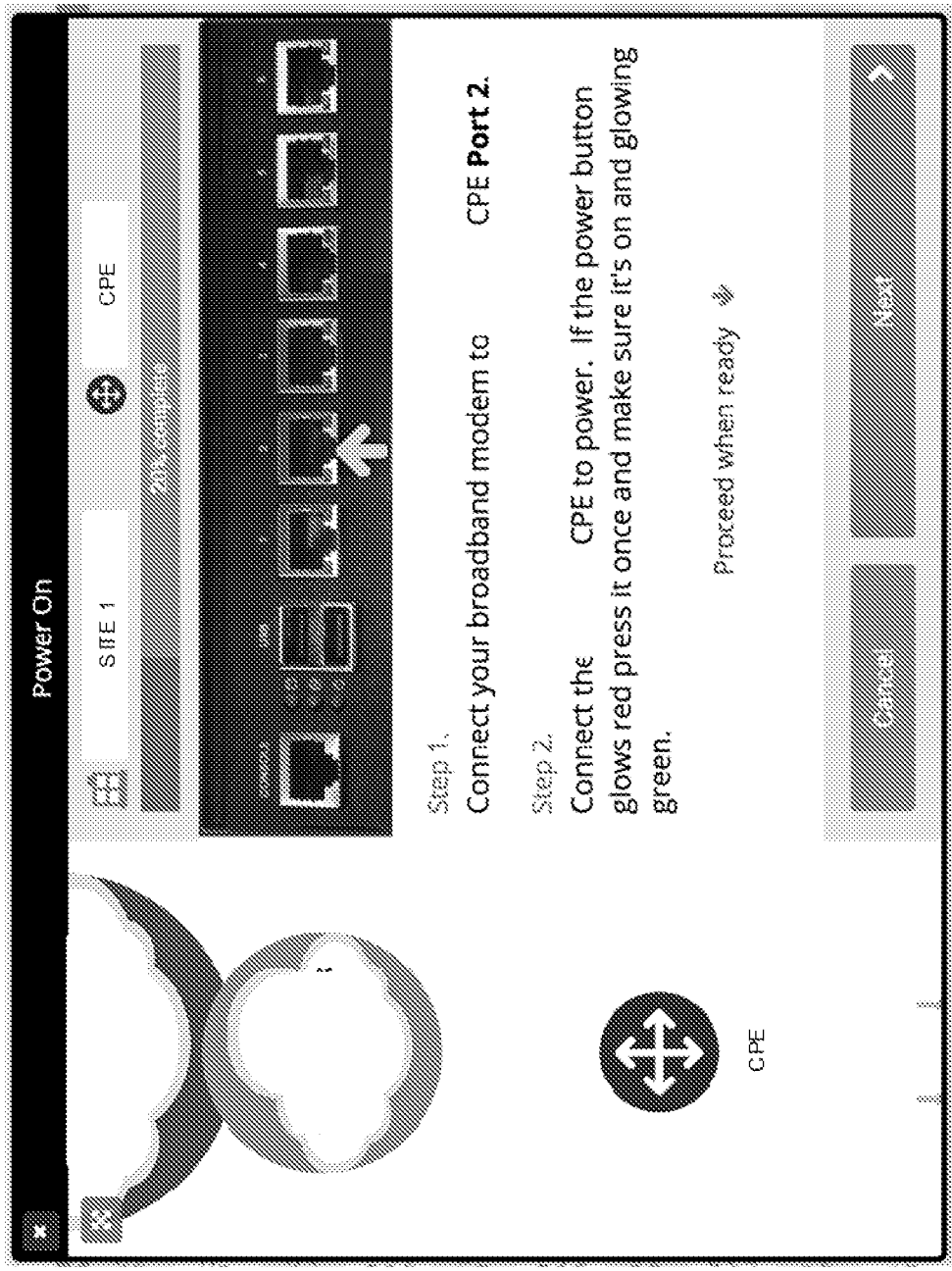

After completion of the initial login and security checks, the installation wizard may then proceed with guiding the user through physical installation and powering up of a first device. In the example of FIGS. 5A-J, the first device installed is the CPE, which is to be coupled to an existing broadband modem. As illustrated in FIG. 5D, the installation wizard may guide the user to connect the broadband modem to the CPE using port 2.

As discussed in the context of FIG. 1, network equipment received at a user site may include a minimally configured vCPE appliance or similar white box device. Such devices arrive at the user site with a basic configuration that, among other things, enables coupling of the device to a network at a predetermined address. Customer network data including address and port assignment information may be maintained in a database, such as the database 226 of FIG. 2, such that after coupling of the vCPE to the network, the vCPE may be located for additional configuration through a ZTP process.

Figure 5E:
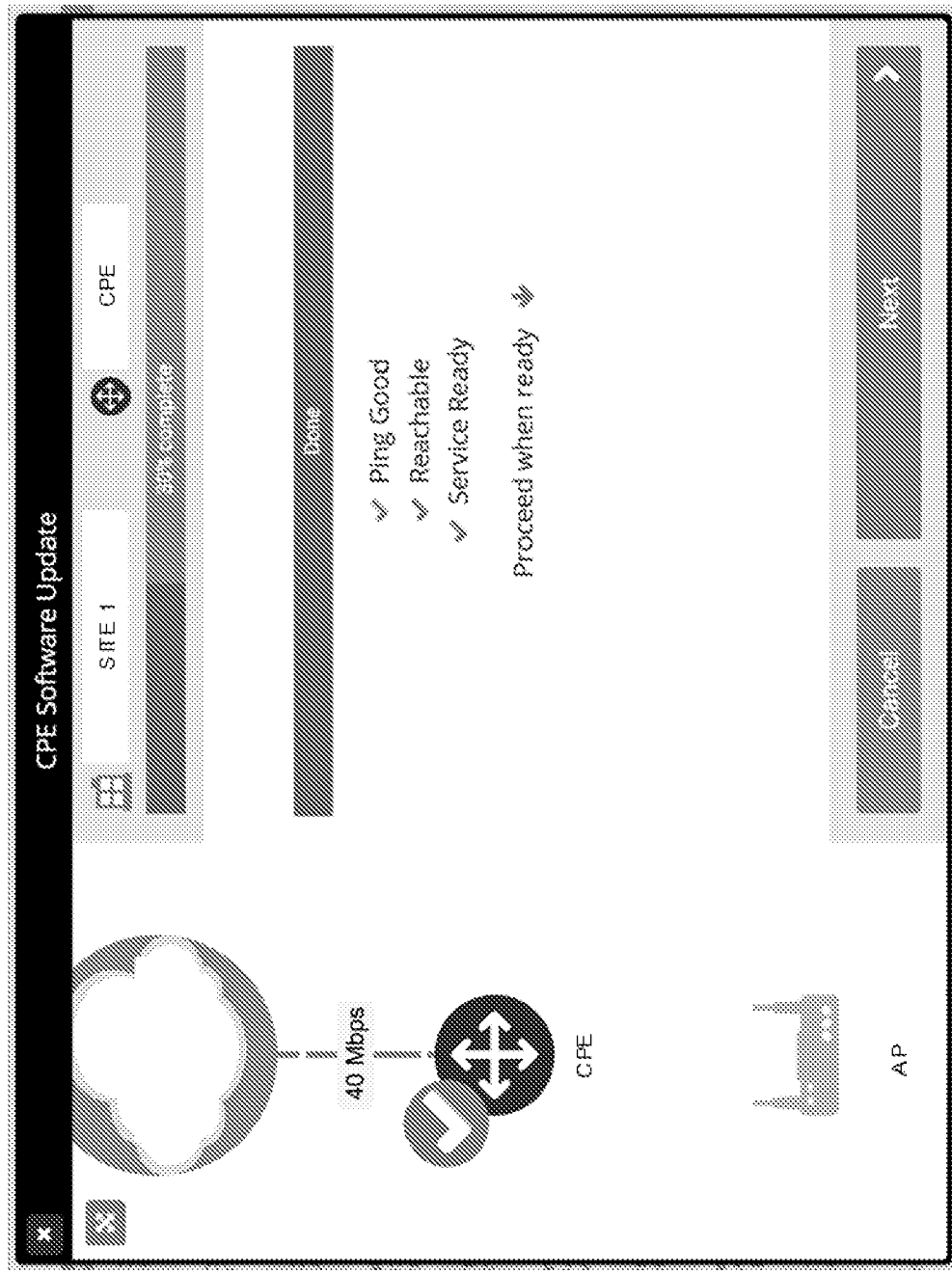

After confirmation by the user that the CPE has been connected as indicated in the installation wizard, the installation wizard may initiate a CPE connection and update routine (as illustrated in FIG. 5E) in which connectivity of the CPE is verified and any necessary software/firmware updates are applied to the CPE. Connection of the CPE generally includes verifying that the CPE has been installed in the network at a location consistent with the address data. Such verification may be performed, for example, by pinging the CPE or otherwise initiating a data exchange with the CPE. In certain implementations, the process of connecting to the CPE may further include provisioning of a network service path over the primary network 102 to the CPE. After connection, the CPE may be provided with any necessary software/firmware required for the CPE. In implementations where the CPE is a vCPE device, for example, such software/firmware may include software/firmware adapted to cause the vCPE to adopt specific network device functionality.

Figure 5F:
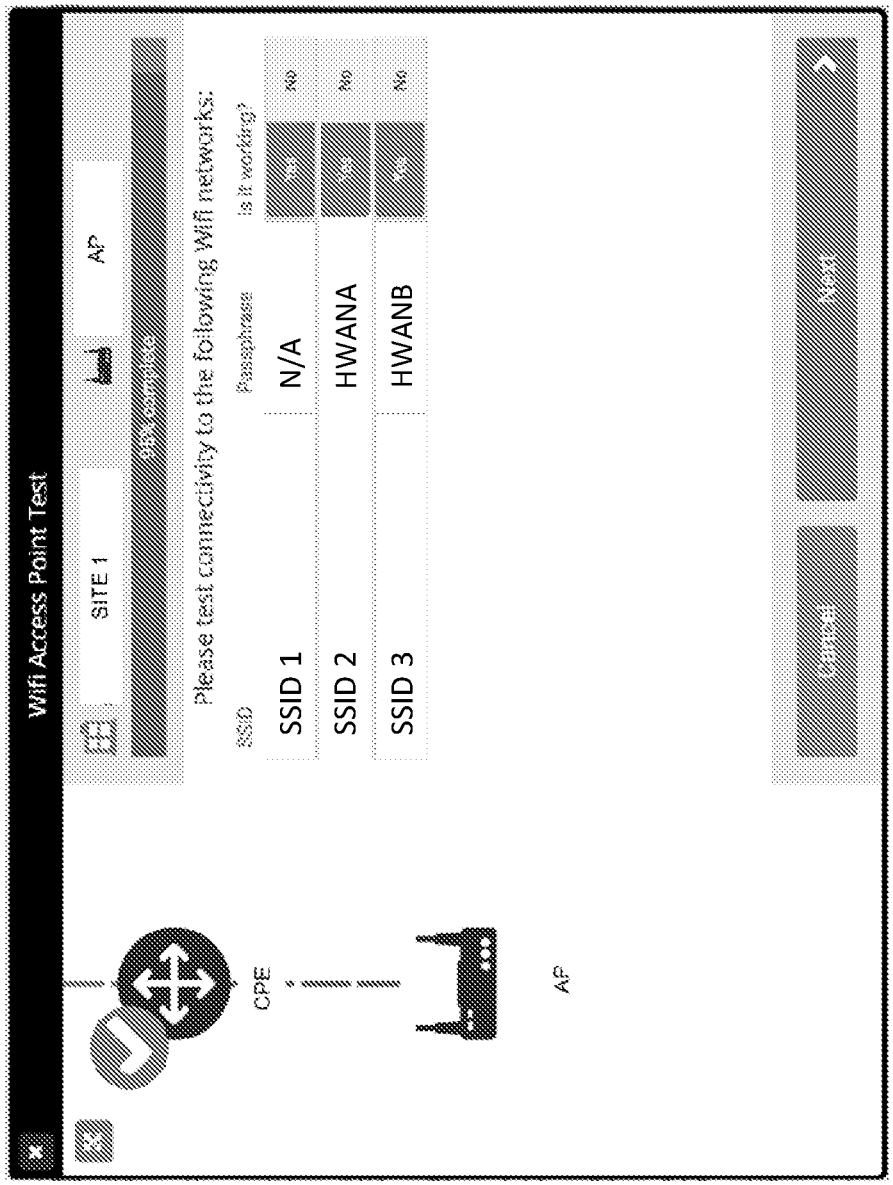
Figure 5G:
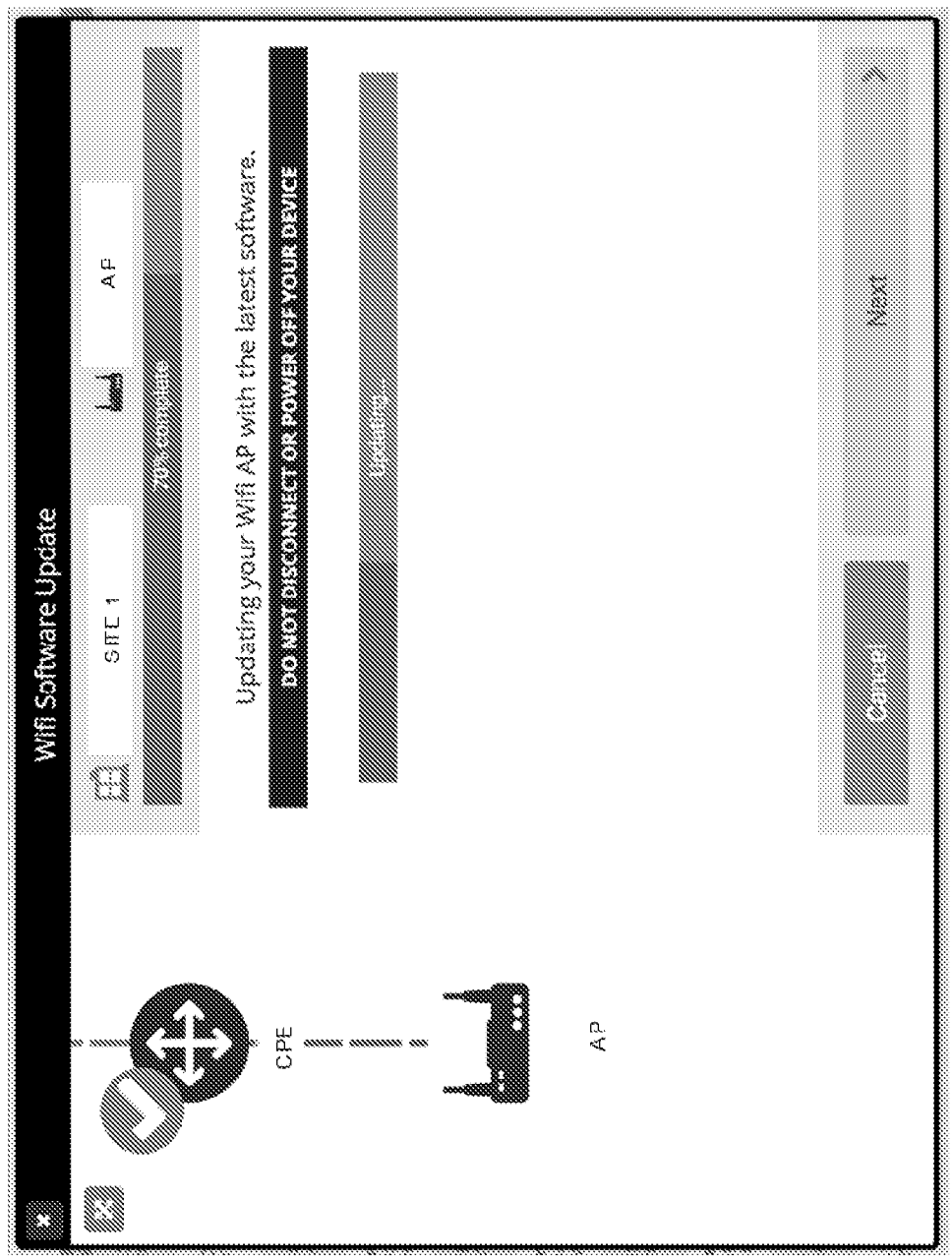
Figure 5H:
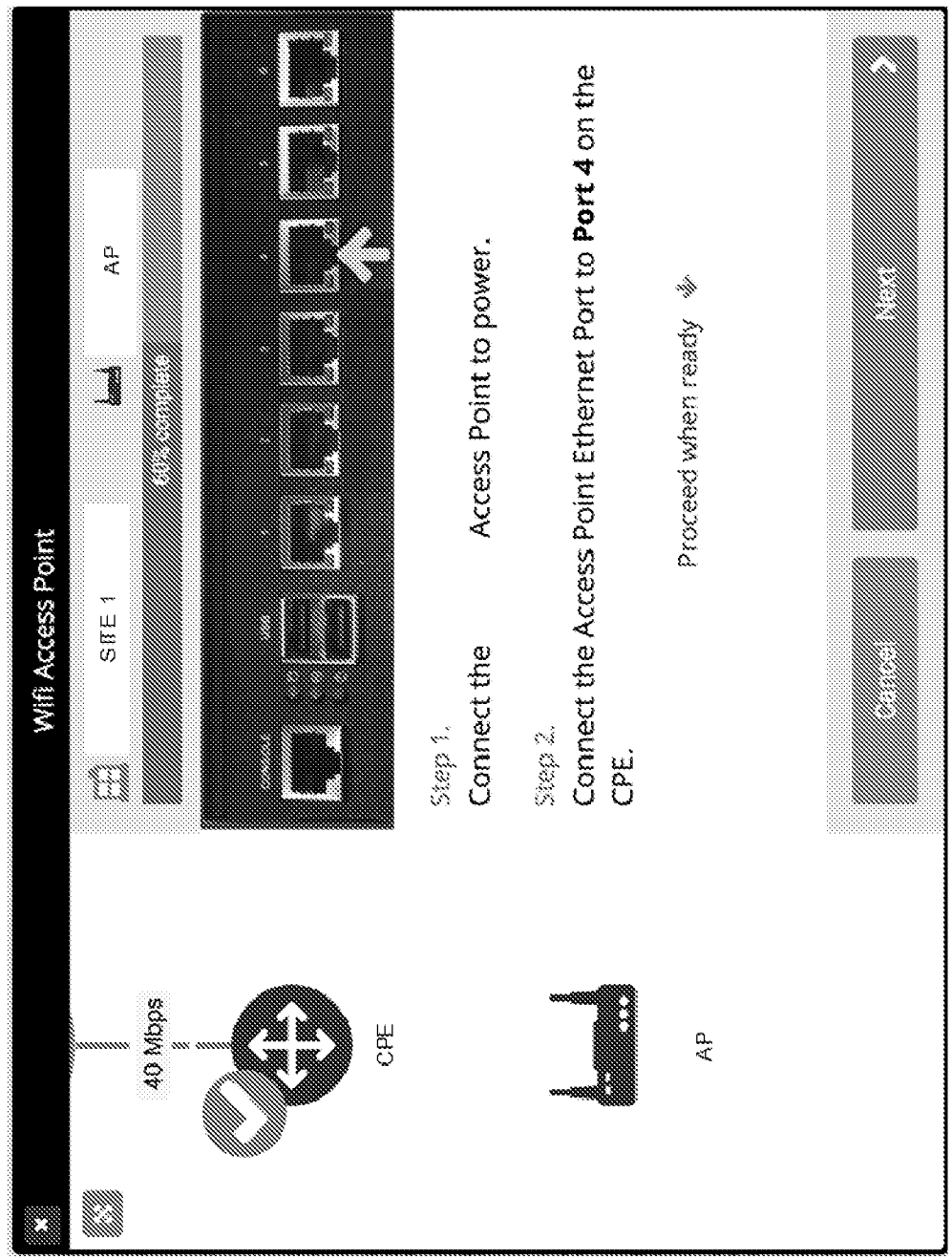
Figure 5I:
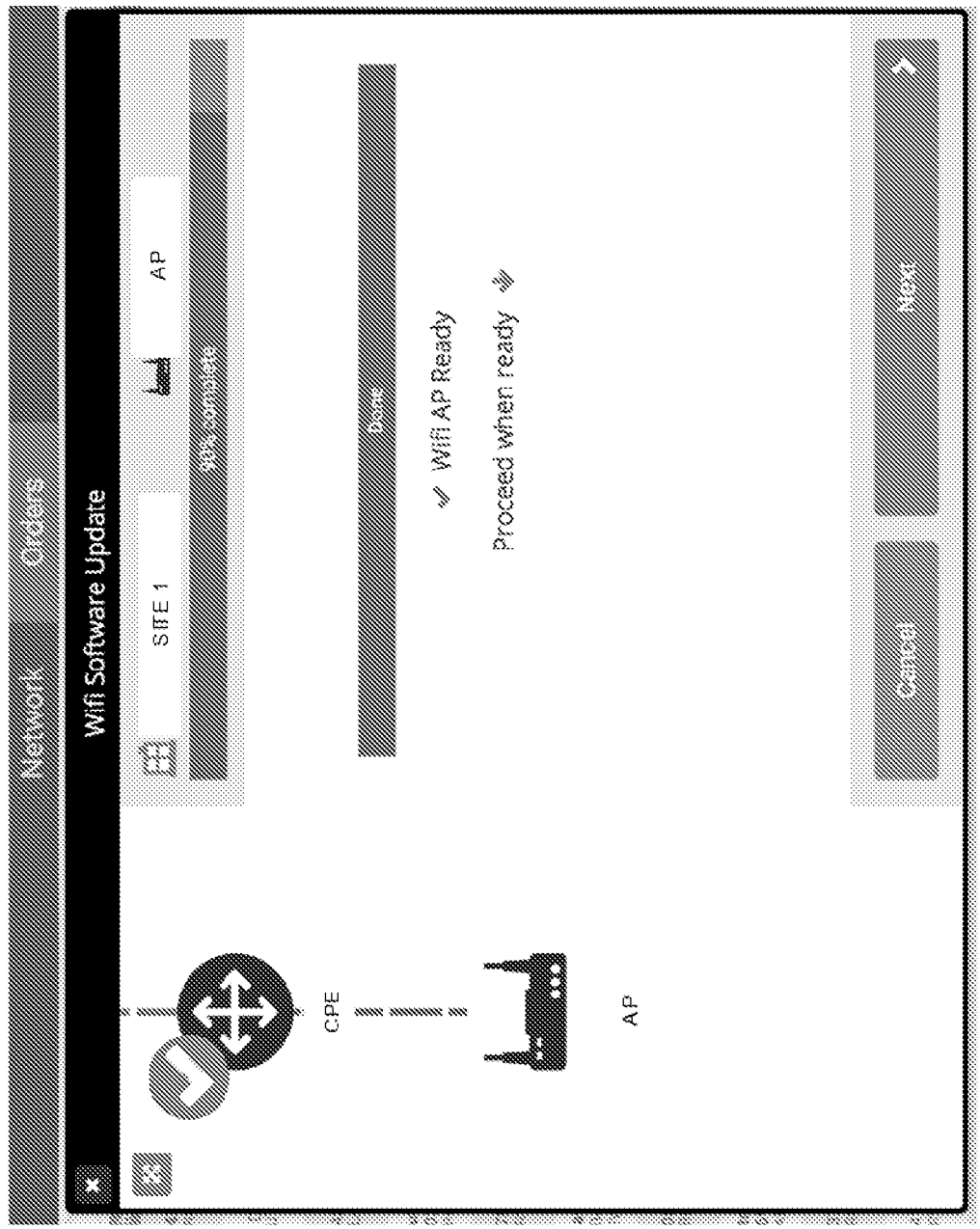
Figure 5J:
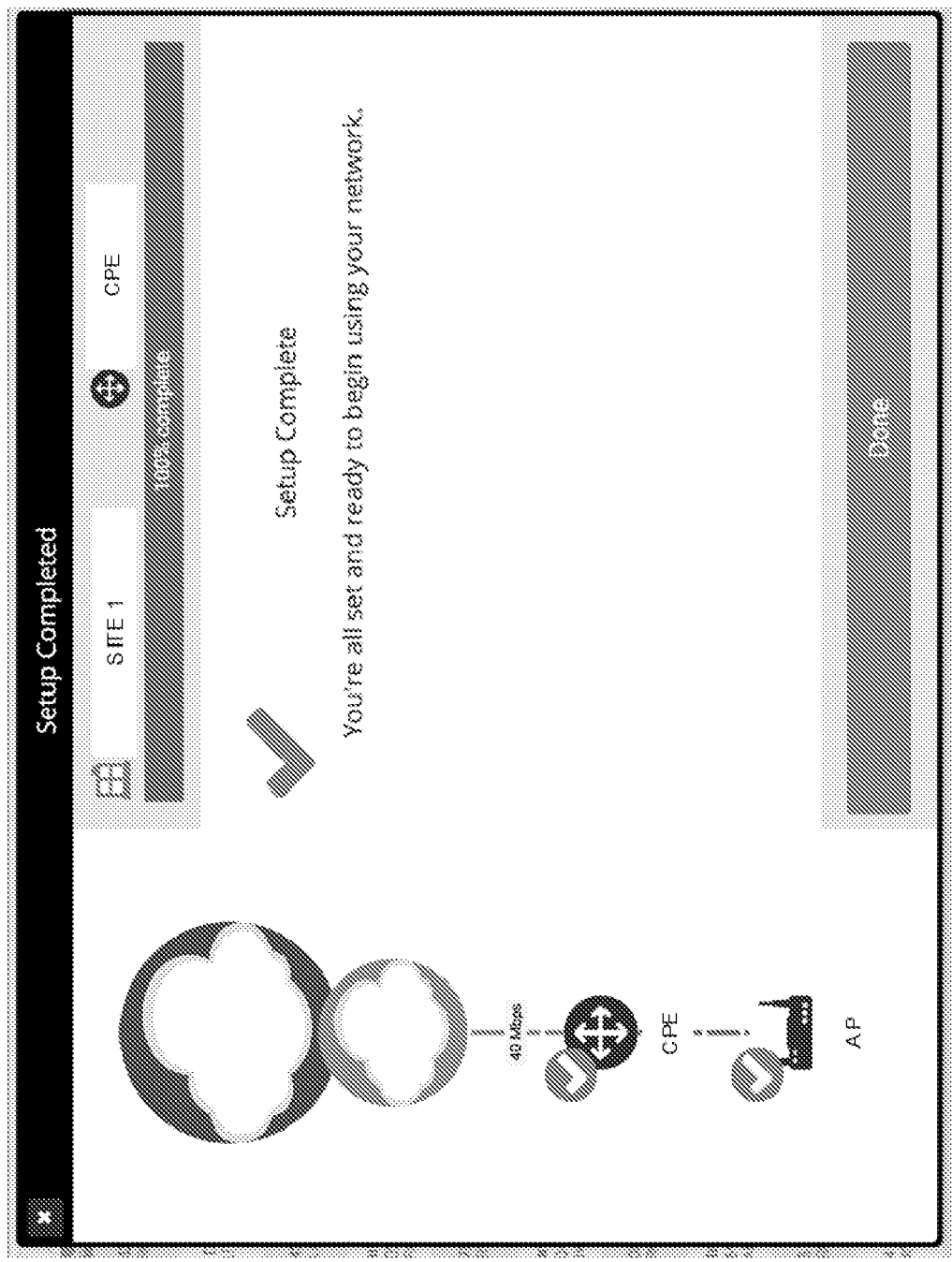

As illustrated in FIGS. 5F-H, the installation wizard may then guide the user through a similar installation process for the access point. More specifically, the installation wizard may guide the user through physical connection of the access point to the CPE, as shown in FIG. 5F, followed by updating of the access points software/firmware and a confirmation of successful installation of the access point, as shown in FIGS. 5G and 5H, respectively. In certain implementations, the installation wizard may further include a final verification of operation of any new equipment that has been installed. For example, in the context of an access point as illustrated in FIG. 5I, the user may be asked to verify that the user is able to connect to Wi-Fi networks established by the access point. To the extent the user is unable to connect to one or more of the wireless networks, the installation wizard may repeat the installation process for one or more of the installed devices. If, on the other hand, all equipment has been successfully installed, the user may be directed to a final completion screen of the installation wizard, as shown in FIG. 5J.

After successful installation and provisioning of a new service, Day 2 services may enable a user to access data and to reconfigure equipment of the user network through the self-service portal 202. Such Day 2 services may include, among other things, receiving and monitoring active site events and analyzing historical active site information. Active site events may include, among other things, alerts or alarms corresponding to equipment failures, changes in bandwidth, bandwidth consumption, and other operational aspects of the user's network. As illustrated in FIG. 2, such functionality may include further interaction between the VNF manager 216 and the self-service portal gateway 204. In certain implementations, for example, the self-service portal 202 may enable a user to communicate with the VNF manager 216 to establish routing rules for traffic handled by the user's network.

Various Day 2 services and functionalities of an example self-service portal 202 are further illustrated in FIGS. 3A-G.

Figure 3A:
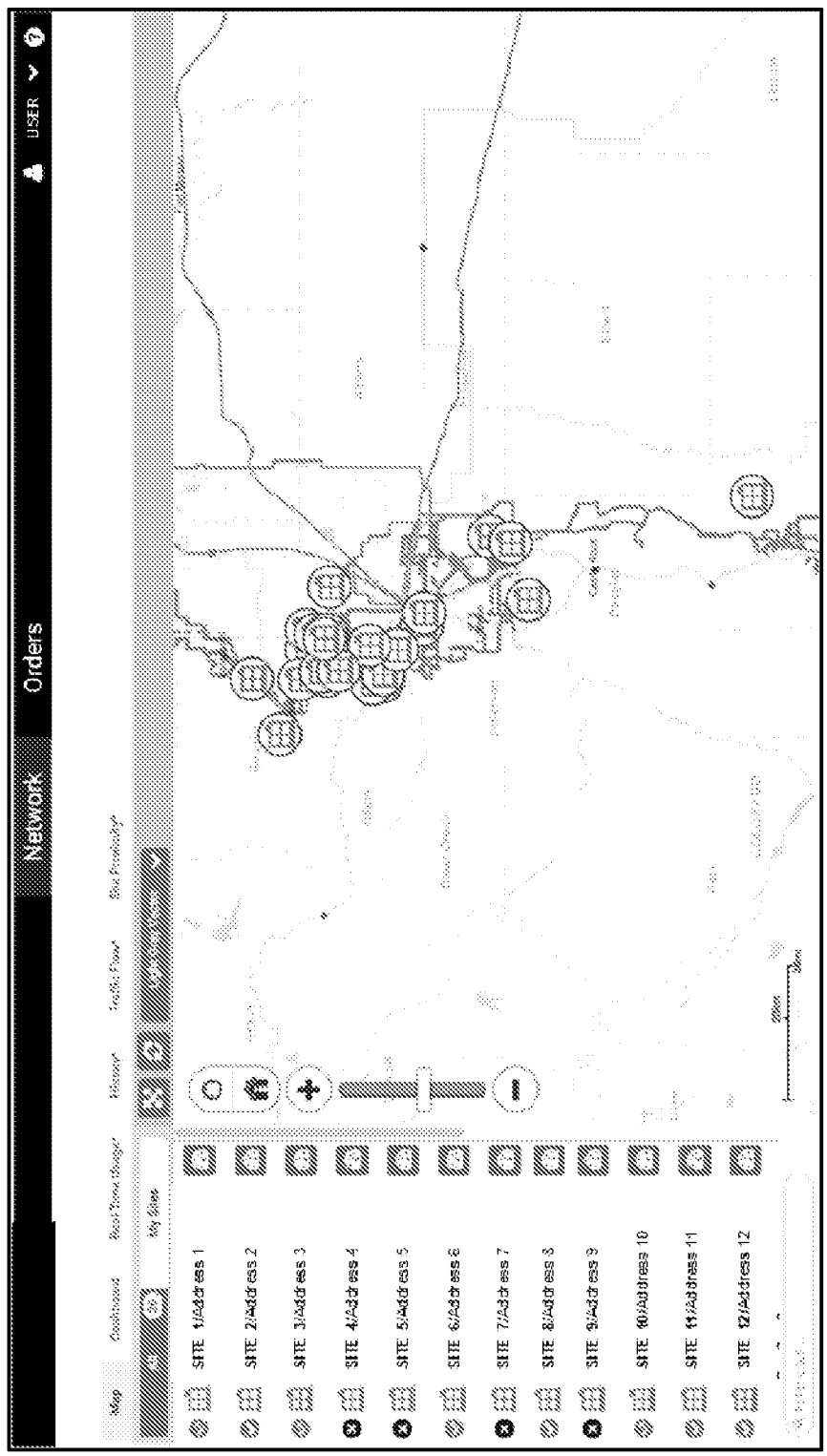
FIGS. 3A-3G are screenshots of a user interface of an example self-service portal, the example user interface for use in monitoring and analyzing a user network.

FIG. 3A illustrates an example of a home screen of the self-service portal 202. As shown, such a home screen may include a map or similar geographic interface depicting the branches or sites of the user's network and a corresponding listing of the branches including a status indicator for each of the sites. The map interface may allow a user to, among other things, select, pan, and zoom into/out of a particular geographic area corresponding to the user's network. Each site within a current view of the map may include a marker or similar indicator corresponding to each user site within the depicted area. Each indicator may further be color coded to provide a general status indication to the user. For example, an indicator for a site with an outstanding alert or alarm may be shaded red while a warning or normal functionality may be indicated using an amber or green shade, respectively.

Figure 3B:
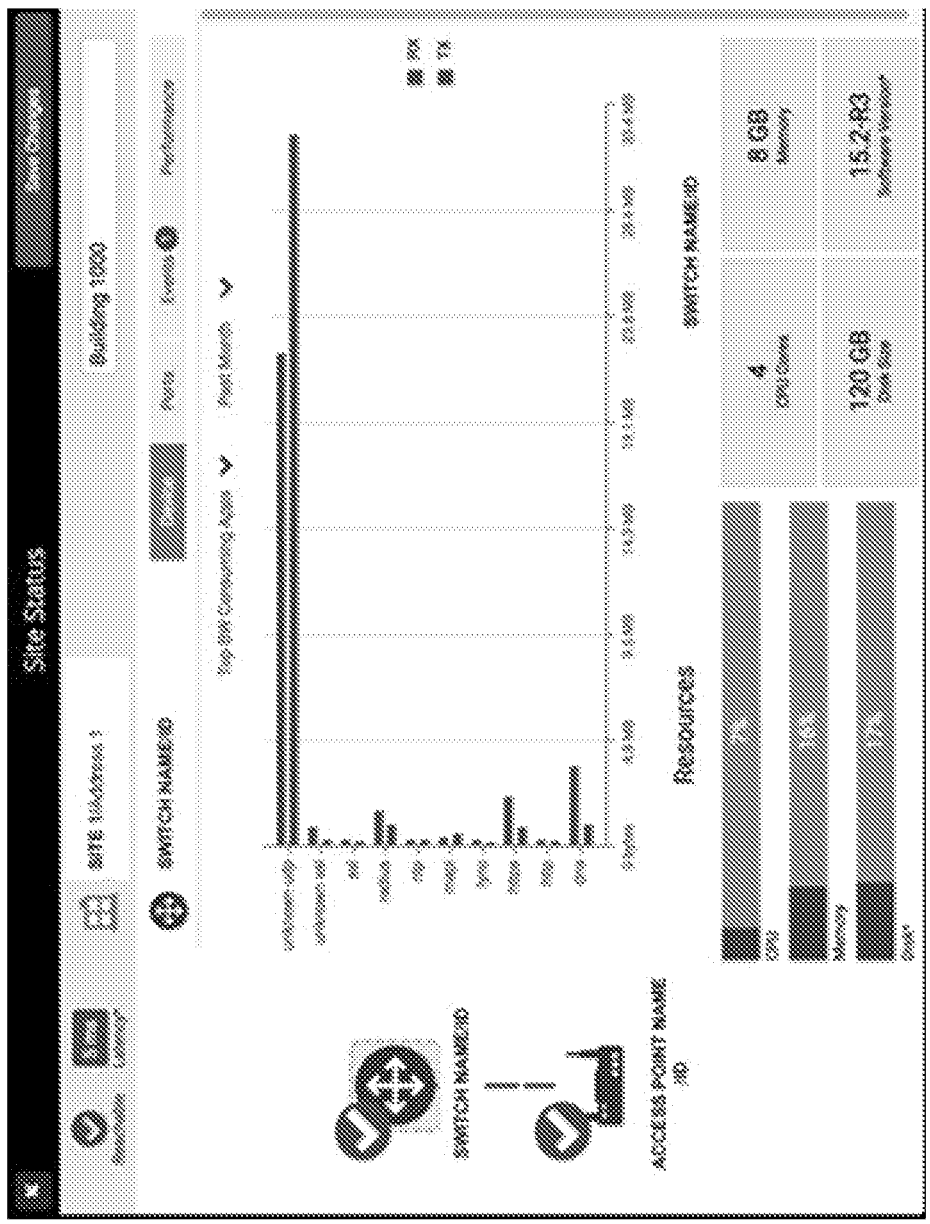
Figure 3C:
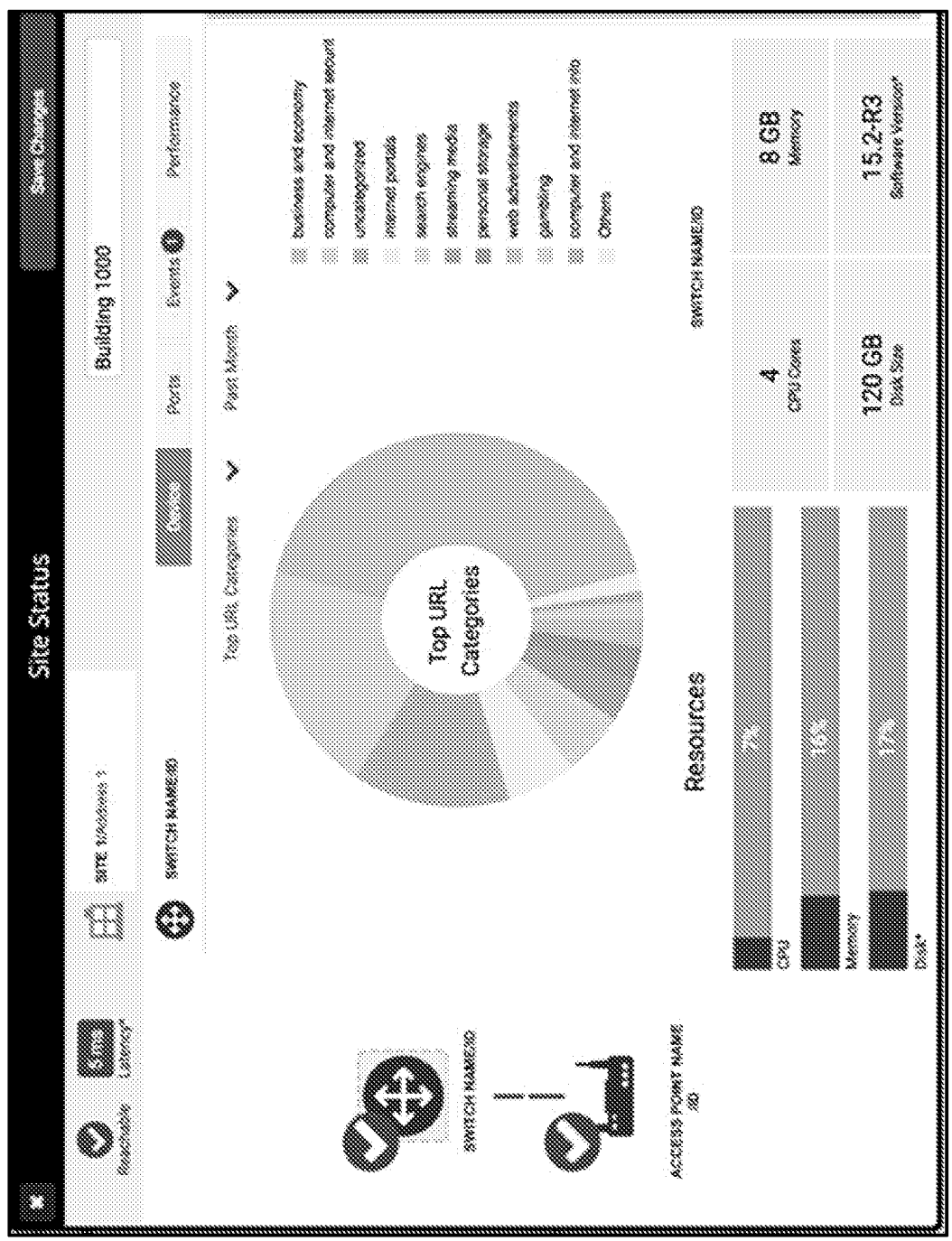

The self-service portal 202 may enable a user to select a particular site and "drill-down" to obtain more specific details regarding the particular site and, in certain instances, to configure aspects of one or more devices of the particular site. For example, FIG. 3B illustrates a basic utilization screen including a layout for a selected site ("SITE 1") and a breakdown of bandwidth consumption. The utilization screen may also allow a user to click or otherwise select a device included in the layout and, in response, may provide additional details for the device. Such details may include, among other things, resource utilization for the device and general properties and configuration data of the device.

Traffic information for a given site may be presented to a user based on various methods of categorization. For example, in FIG. 3C a breakdown of traffic for SITE 1 is provided based on url categories. In other implementations, other methods of categorization may also be provided including, without limitation, bandwidth consumption by business unit or user, by time of day, by specific websites, and by application.

Figure 3D:
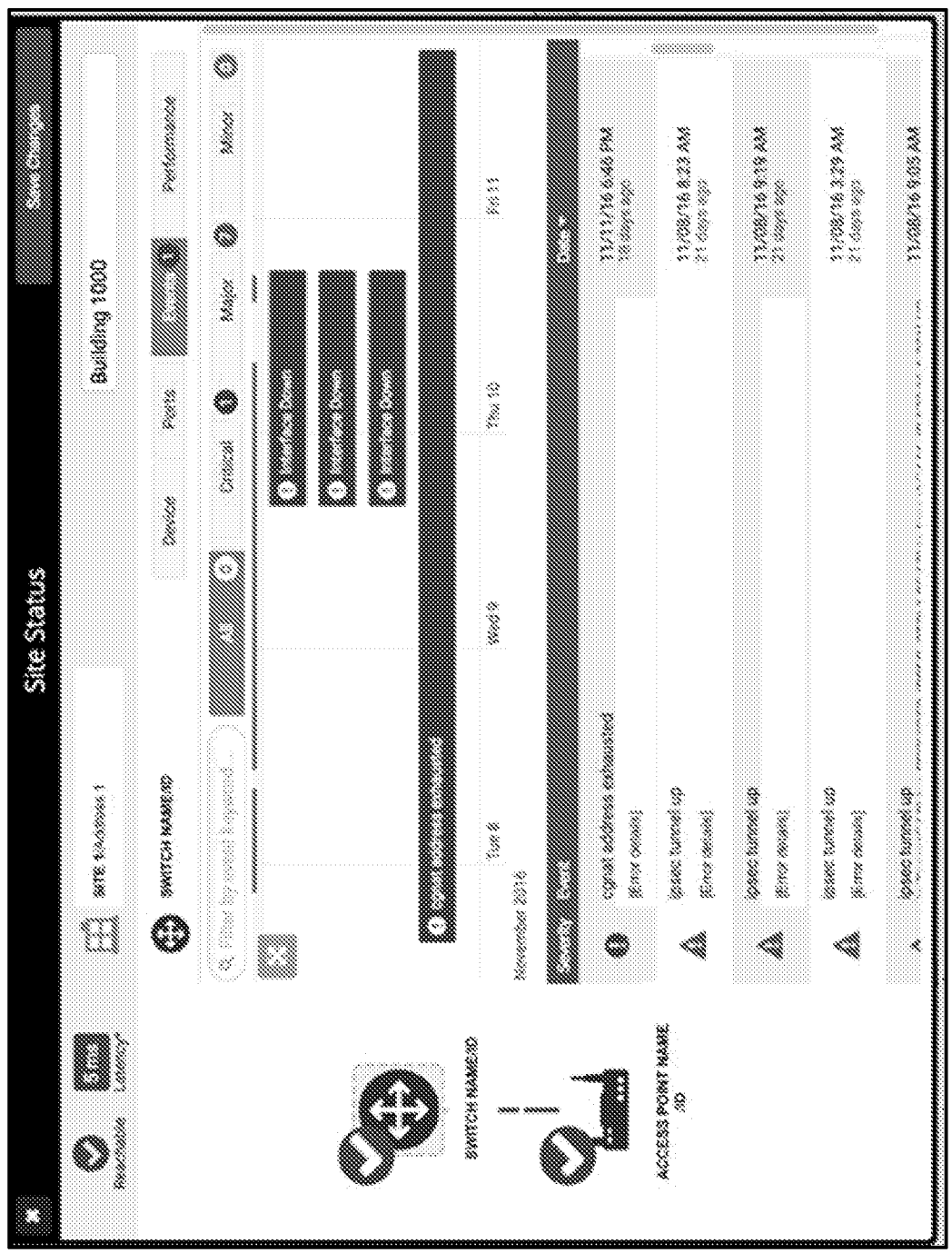

The self-service portal 202 may also allow a user to monitor events associated with the network equipment for a branch of the user's network. As shown in FIG. 3D, for example, a timeline is provided for illustrating the occurrence and duration of network events. A corresponding listing of network events may also be provided. In certain implementations, network events may be categorized based on their severity and may be color coded to reflect their severity. The self-service portal may also be integrated with a system for generating and issuing alerts and events to a user of the self-service portal. Such a system may be configured to generate and transmit messages, such as emails or text messages, to a user in response to, the occurrence of an event of a particular type or severity. The user may then log into the self-service portal 202 to, among other things, obtain additional details regarding the event and initiate a resolution of any associated issues.

Figure 3E:
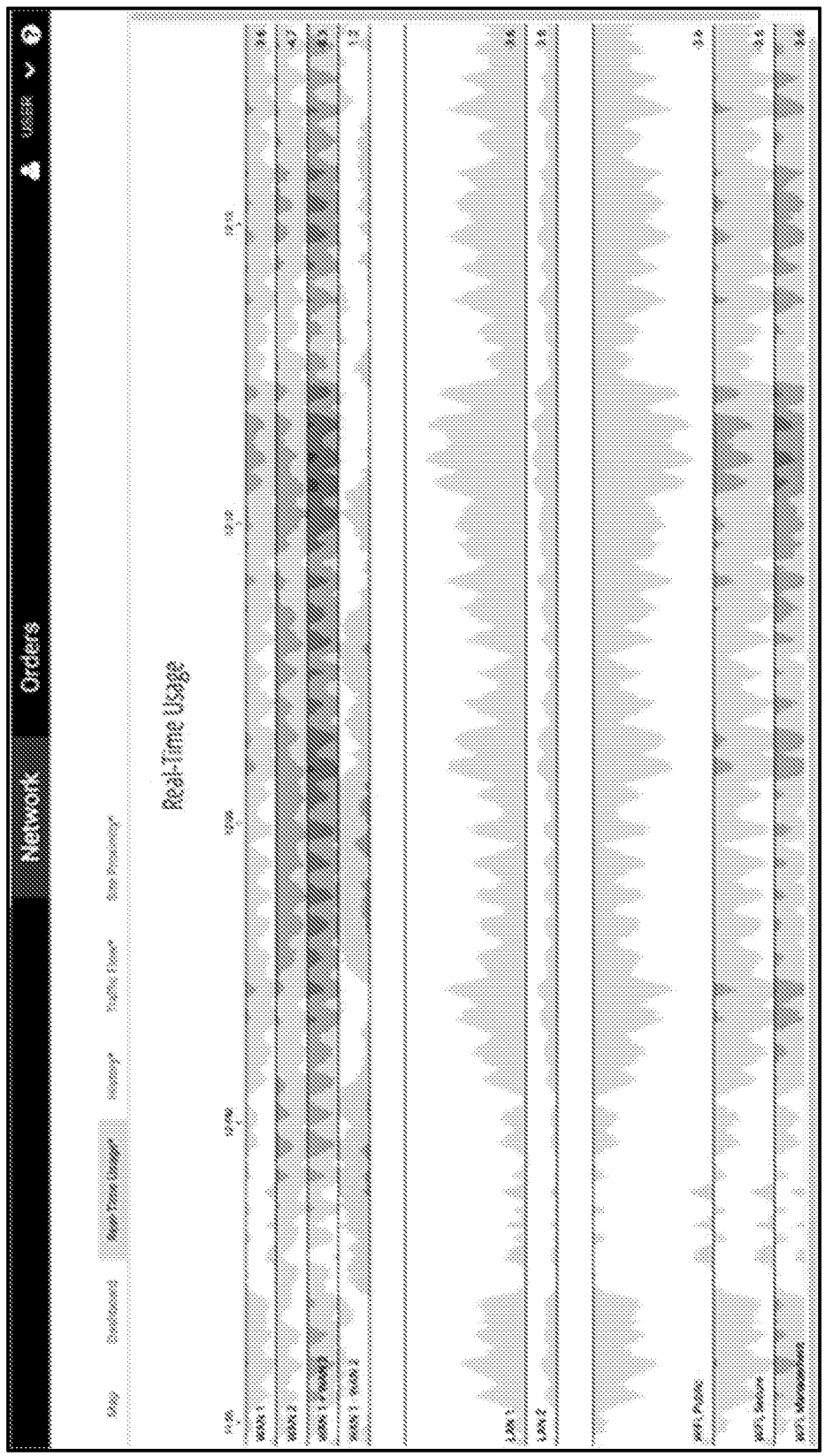

In certain implementations, a user may also access real-time usage statistics through the self-service portal 202. For example, FIG. 3E illustrates a real-time display of network-wide traffic for a user's network. The real-time display may be customizable by a user. For example, the user may select, among other things, the range of time and the networks or branches displayed. In certain implementations, the real-time display may display multiple branches of the user's network in parallel such that the user may readily compare traffic for different branches of the network. The real-time display may also be used to display comparisons or other combinations of network traffic from different branches. For example, the real-time display illustrated in FIG. 3E includes each of a real-time display of cumulative traffic for two wide area networks ("WAN 1+WAN 2") as well as a difference in traffic between the same ("WAN 1−WAN 2").

Figure 3F:
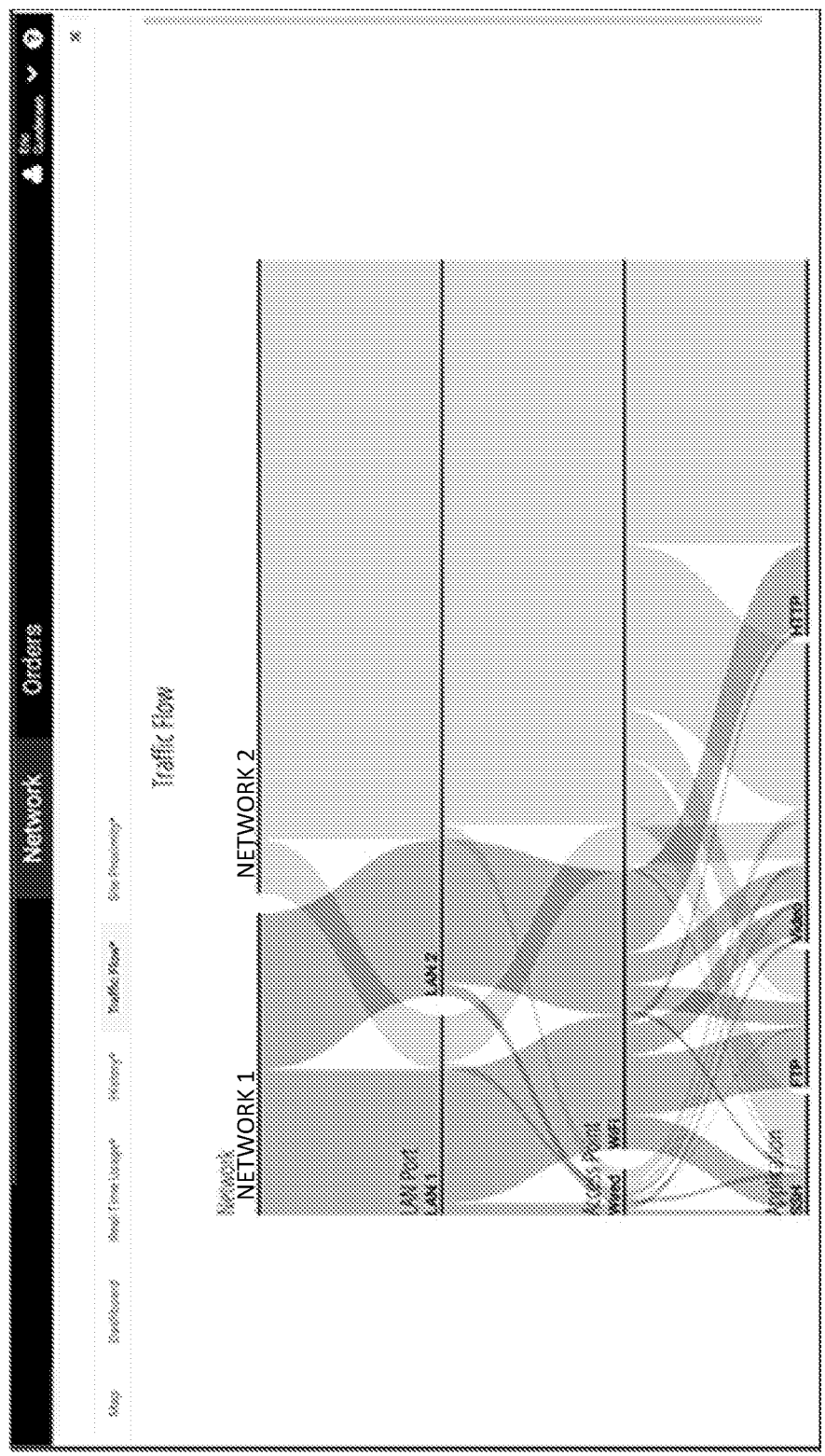
Figure 3G:
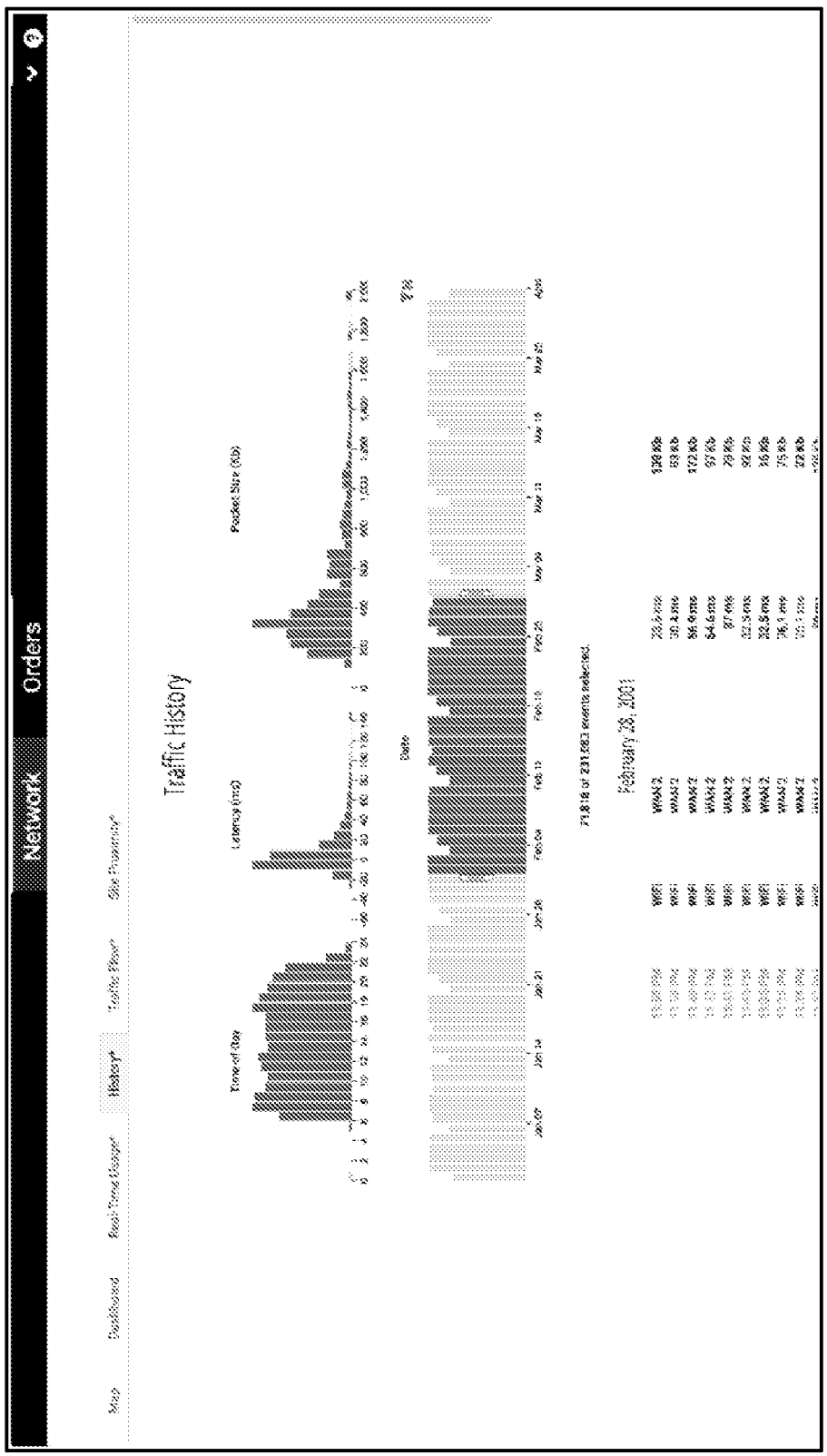

FIGS. 3F and 3G illustrate additional visualizations for use in monitoring and analyzing traffic flow within a user's network, each of which may be available through the self-service portal 202. FIG. 3F illustrates an example interface for analyzing historical network traffic data. In the implementation illustrated in FIG. 3F, a user may select a date range to cause the interface to dynamically generate and display a set of histograms. Such histograms may show, among other things, the quantity of packets transmitted by time of data, the quantity of packets by latency, and the quantity of packets by packet size. In certain implementations, the interface may allow a user to select a specific date or time to display a more detailed breakdown of individual packets. FIG. 3G illustrates an example visualization for traffic flow within a network that may be accessible through the self-service portal. The visualization includes a tiered breakdown of traffic flow patterns within the user's network based on network, LAN port, access point, and application.

In addition to visualizing and analyzing traffic flow within a customer network, the self-service portal 202 may also enable a user to modify traffic flow patterns within a network or establish rules for traffic routing within the customer network. Such traffic routing may include adjusting the distribution of traffic between one or more network services. For example, as illustrated in FIG. 3F, a customer may subscribe to multiple network services through which traffic associated with the customer may be directed. Such services may vary in terms of, among other things, their respective network types, bandwidth, cost, security, and other performance and business-related aspects. Accordingly, to make the most efficient use of the various network services available to the customer, the customer may wish to direct data having certain characteristics to specific network services.

In implementations of the current disclosure, such routing may be performed through the self-service portal 202 by allowing the user to reconfigure specific devices of the customer network or by providing general rules regarding traffic routing by which the customer network are to be governed. Such routing rules may be based on characteristics of the data being transmitted including, without limitation, one or more of a file type of the data, a source of the data, a packet size of the data, a time of day, an access point from which the data is being requested, an access point from which the data is being provided, a protocol used to communicate the data, and an amount of unconsumed bandwidth for one or more of the available network services.

Figure 6:
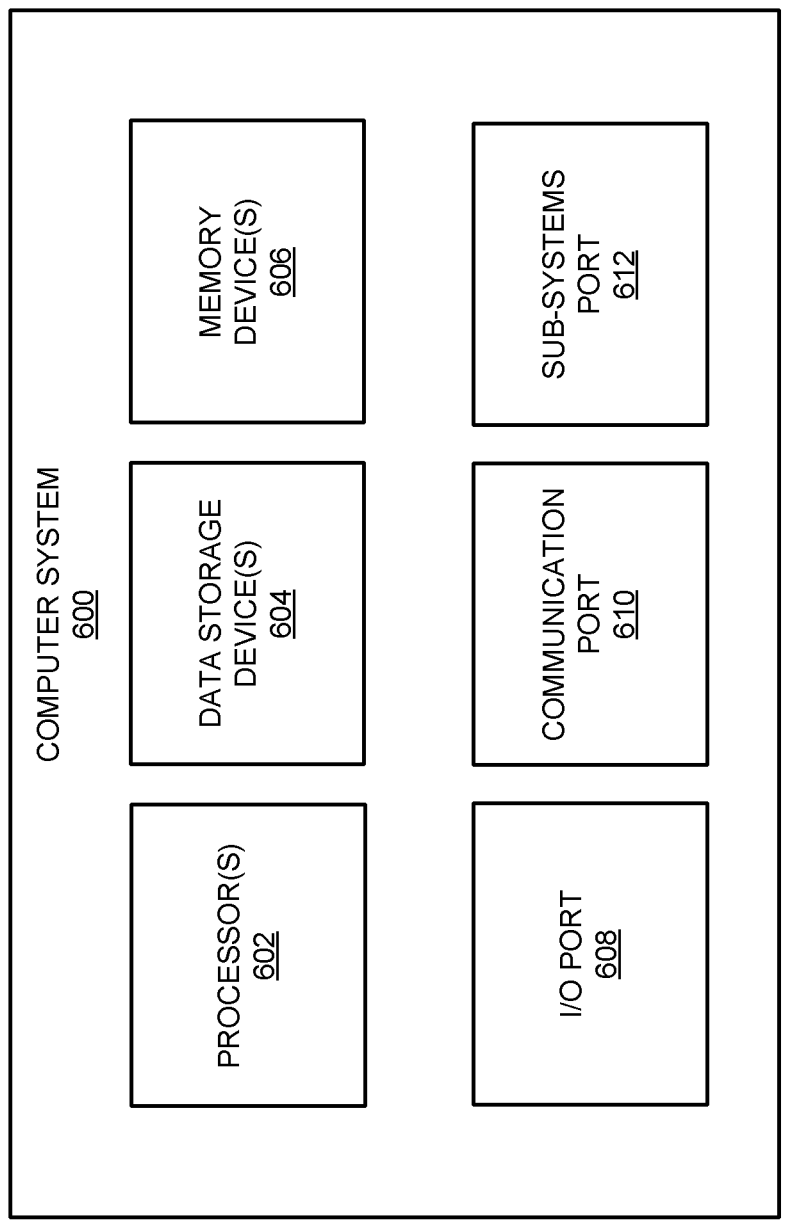
FIG. 6 is a diagram illustrating an example of a computing system which may be used in implementing embodiments of the present disclosure.

Referring to FIG. 6, a schematic illustration of an example computing system 600 having one or more computing units that may implement various systems and methods discussed herein is provided. It will be appreciated that specific implementations of these devices may be of differing possible specific computing architectures not all of which are specifically discussed herein but will be understood by those of ordinary skill in the art.

The computer system 600 may be a computing system capable of executing a computer program product to execute a computer process. Data and program files may be input to computer system 600, which reads the files and executes the programs therein. Some of the elements of the computer system 600 are shown in FIG. 6, including one or more hardware processors 602, one or more data storage devices 604, one or more memory devices 608, and/or one or more ports 608-612. Additionally, other elements that will be recognized by those skilled in the art may be included in the computing system 600 but are not explicitly depicted in FIG. 6 or discussed further herein. Various elements of the computer system 600 may communicate with one another by way of one or more communication buses, point-to-point communication paths, or other communication means not explicitly depicted in FIG. 6.

The processor 602 may include, for example, a central processing unit (CPU), a microprocessor, a microcontroller, a digital signal processor (DSP), and/or one or more internal levels of cache. There may be one or more processors 602, such that the processor 602 includes a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on data storage device(s) 604, stored on memory device(s) 606, and/or communicated via one or more of the ports 608-612, thereby transforming the computer system 600 in FIG. 6 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

One or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. Data storage devices 604 may include, without limitation, magnetic disk drives, optical disk drives, solid state drives (SSDs), flash drives, and the like. Data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. One or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608, a communication port 610, and a sub-systems port 612, for communicating with other computing, network, or vehicle devices. It will be appreciated that the ports 608-612 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from the computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via communication port 610 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 610 may communicate with an antenna for electromagnetic signal transmission and/or reception. The computer system 600 may further include a sub-systems port 612 for communicating with one or more external systems.

The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended thereto.

We claim:

1. A method of provisioning network services comprising:
   receiving, through a portal accessible by a user computing device, a provisioning request to provision a network service through a network;
   authenticating the user computing device by verifying credentials associated with the user computing device, wherein the credentials are verified using a token request sent by the user computing device;
   performing a first configuration operation of network equipment;
   receiving a notification that the network equipment is physically connected to the network; and
   after receiving the notification, executing a second configuration operation of the network equipment, the second configuration operation comprising initializing one or more network functions of the network equipment.

2. The method of claim 1 further comprising configuring a network path within the network to provide the network service to the network address.

3. The method of claim 2 further comprising providing the network service over the network service path.

4. The method of claim 1, wherein the network equipment is a virtual customer premise equipment (vCPE) appliance.

5. The method of claim 1, further comprising, after receiving the notification, deploying one or more of a software update or a firmware update to the network equipment, wherein the second configuration includes installing the one or more of the software update or the firmware update on the network equipment.

6. The method of claim 1, further comprising:
receiving, through the portal, an inquiry regarding the network service; and
generating and transmitting, in response to the inquiry, a network representation including the network equipment for display on the user device.

7. The method of claim 6, wherein generating the network representation further comprises retrieving existing network topology data for a customer network within which the network equipment is to be installed, the network representation further including elements of the existing network topology.

8. The method of claim 1, wherein the network service path is a first network service path, the method further comprising:
receiving a redirection request, through the portal, to redirect traffic, at least in part, from the first network service path to a second network service path; and
reconfiguring one or more network elements within the network to redirect traffic from the first network service path to the second network service path.

9. The method of claim 8, wherein the redirection request includes one or more traffic characteristics for identifying traffic to be redirected to the second network path.

10. The method of claim 8, wherein the one or more network traffic characteristics include at least one of a file type, a traffic source, a data packet size, a time of day, an access point from which the traffic is being requested, and a protocol used to transmit the traffic.

11. A system for provisioning network services comprising:
one or more computing devices configured to:
provide a portal accessible by a user computing device;
receive a provisioning request through the portal from the user computing device to provision a network service over a network;
initiate a first configuration operation for network equipment required to provide the network service;
receiving a notification that the network equipment is coupled to the network;
in response to receiving the notification, initiating a second configuration operation for the network equipment, the second configuration operation comprising initializing one or more network functions of the network equipment corresponding to the network service.

12. The system of claim 11, wherein the one or more computing devices are further configured to establish a network service path through the network to the network address assigned to the network equipment.

13. The system of claim 12, wherein the network service path is a first network service path and the one or more computing devices are further configured to:
receive a redirection request, through the portal, to redirect traffic, at least in part, from the first network service path to a second network service path; and
reconfigure one or more network elements along the first network service path to redirect traffic from the first network service path to the second network service path.

14. The system of claim 13, wherein the redirection request includes at least one traffic characteristic for identifying traffic to be redirected to the second network service.

15. The method of claim 14, wherein the one or more network traffic characteristics include at least one of a file type, a traffic source, a data packet size, a time of day, an access point from which the traffic is being requested, and a protocol used to transmit the traffic.

16. The system of claim 11, wherein the one or more computing devices are configured to initiate the second configuration for the network equipment by deploying an update to the network equipment, the update configured to cause the network equipment to automatically initialize the one or more network functions.

17. The system of claim 11, wherein the network equipment is a virtual customer premise equipment (vCPE) appliance.

18. A method of provisioning network services comprising:
initiating a first configuration operation for network equipment required to provide a network service through a network;
establishing a network service path within the network, the network service path including the network address assigned to the network equipment;
receiving a notification that the network equipment is coupled to the network;
in response to receiving the notification, initiating a second configuration operation for the network equipment, the second configuration operation comprising initializing one or more network functions of the network equipment required for providing the network service.

19. The method of claim 18, wherein the second configuration operation further comprises deploying an update to the network equipment including at least one of software or firmware for performing the one or more network functions.

20. The method of claim 18, wherein the network equipment is a virtual customer premise equipment (vCPE) appliance.

* * * * *